United States Patent
Endo et al.

(10) Patent No.: US 7,495,625 B2
(45) Date of Patent: Feb. 24, 2009

(54) ANTENNA FOR READER/WRITER AND READER/WRITER HAVING THE ANTENNA

(75) Inventors: Takanori Endo, Tokyo (JP); Seirou Yahata, Tokyo (JP); Takashi Tsuchida, Tokyo (JP)

(73) Assignee: Mitsubishi Materials Corporation, Tokyo (JP)

(*) Notice: Subject to any disclaimer, the term of this patent is extended or adjusted under 35 U.S.C. 154(b) by 0 days.

(21) Appl. No.: 10/500,457

(22) PCT Filed: Jan. 17, 2003

(86) PCT No.: PCT/JP03/00364

§ 371 (c)(1),
(2), (4) Date: Mar. 1, 2005

(87) PCT Pub. No.: WO03/061069

PCT Pub. Date: Jul. 24, 2003

(65) Prior Publication Data

US 2005/0162331 A1    Jul. 28, 2005

(30) Foreign Application Priority Data

| Jan. 17, 2002 | (JP) | ............................. 2002-008146 |
| Sep. 26, 2002 | (JP) | ............................. 2002-280719 |
| Jan. 7, 2003 | (JP) | ............................. 2003-000765 |

(51) Int. Cl.
*H01Q 7/08* (2006.01)

(52) U.S. Cl. ...................... 343/788; 343/787; 343/895; 340/572.5

(58) Field of Classification Search ................ 343/741, 343/742, 866, 788, 895; 340/572.5, 572.6
See application file for complete search history.

(56) References Cited

U.S. PATENT DOCUMENTS

| 5,347,263 | A | | 9/1994 | Carroll et al. ................ 343/572 |
| 5,833,770 | A | | 11/1998 | Ominato et al. .............. 148/305 |
| 5,912,622 | A | * | 6/1999 | Endo et al. ................ 340/572.5 |
| 6,018,298 | A | * | 1/2000 | Endo et al. ................ 340/572.5 |
| 6,229,444 | B1 | * | 5/2001 | Endo et al. ................ 340/572.6 |
| 6,285,284 | B1 | * | 9/2001 | Soe et al. ................... 340/572.1 |
| 6,927,738 | B2 | * | 8/2005 | Senba et al. |
| 6,930,646 | B2 | * | 8/2005 | Yahata et al. ................ 343/718 |
| 2005/0007296 | A1 | * | 1/2005 | Endo et al. ................... 343/895 |

FOREIGN PATENT DOCUMENTS

| EP | 0 762 535 | | 3/1997 |
| EP | 986 037 | | 3/2000 |
| JP | 4-321190 | | 11/1992 |
| JP | 08-079127 | * | 3/1996 |
| JP | 2002-208814 | * | 7/1996 |

(Continued)

*Primary Examiner*—Tan Ho
(74) *Attorney, Agent, or Firm*—Oblon, Spivak, McClelland, Maier & Neustadt, P.C.

(57) ABSTRACT

A soft magnetic member which is formed by a composite of an organic object to satisfy a predetermined relationship with an antenna area, a circumference length, and a magnetic transmission ratio and a conductive member are provided between an antenna coil which is formed by at least one loop and a metal surface of the conductive member such as a metal casing. The magnetic flux which invades into the conductive object is blocked by the soft magnetic member and the conductive member so as to restrict the influence thereof.

16 Claims, 16 Drawing Sheets

| | FOREIGN PATENT DOCUMENTS | |
|---|---|---|
| JP | 9-284038 | 10/1997 |
| JP | 10-107531 | 4/1998 |
| JP | 10-162260 | 6/1998 |
| JP | 11-233392 | 8/1999 |
| JP | 11-332631 | 12/1999 |
| JP | 11-339143 * | 12/1999 |
| JP | 2000-276565 * | 10/2000 |
| JP | 2001-056847 | 2/2001 |
| JP | 2002-3343141 * | 11/2002 |
| WO | WO 99/49437 * | 9/1999 |
| WO | 00/28674 | 5/2000 |

* cited by examiner

ANTENNA FOR READER/WRITER AND READER/WRITER HAVING THE ANTENNA

TECHNICAL FIELD

The present invention relates to a structure for an antenna for an RFID (Radio Frequency Identification) system in which data are read/written in a non-contacting manner for a mounted IC chip. In particular, the present invention relates to a structure for a reader/writer antenna which can be used so as to contact to a metal member.

BACKGROUND ART

In recent years, an RFID system is commonly used in which data are transmitted between a transponder which is provided with an IC chip and a reader/writer (or a reader). In such an RFID system, data are transmitted by using antennae which are provided to the transponder and the reader/writer. Therefore, it is possible to perform data communication even if the transponder is disposed from the reader/writer by several centimeters to several tens centimeters. Also, there is an advantage to a dirty condition or a static electricity; thus, such an RFID system is commonly used for various usages such as a production control in a manufacturing facility, a material handling control, and an admission control.

Conventionally, a hollow coil has been used for an antenna which is used for a reader/writer and a transponder for such an RFID system because a hollow coil is inexpensive and has a superior performance. For such an antenna for such a hollow coil, a lead wire which is coated by an insulating layer is wound around a base plate in a spiral manner or a member which is formed by etching a metal layer such as an aluminum layer or a copper layer which are layered on a base plate are commonly known (Japanese Unexamined Patent Application, First Publication No. Hei 321190).

However, a magnetic flux is generated in a direction which penetrates through the base plate in the above explained hollow coil antenna; therefore, if the antenna coil contacts a metal object, the magnetic flux penetrates through the base plate so as to reach to the metal object. By doing this, an eddy current is generated in the metal member; thus, there are problems in that a resonation frequency in a resonating circuit which is formed by an antenna coil and a condenser varies, or a loss increases.

In particular, a reader/writer is different from the transponder in that the reader/writer needs many electronic circuits such as a circuit for driving the reader/writer, a control circuit, and a power supply. These electronic circuits and a supporting member for supporting such circuits contain a lot of metal member; therefore, in the reader/writer antenna, there occur a variance for the resonating frequency and a loss may increase due to receiving an influence of these metal members. Therefore, a structure is used for the conventional reader/writer in which the antenna and the electronic circuit are contained in different cases such that a cable connects therebetween.

However, in such a structure, it is necessary to separate the casing for the electronic circuits and the casing for the antenna every time a device is carried and connect them every time they are used. Such a condition is not easy from a handling point of view. Also, it is preferable to form the small, rigid casing by a metal member such as an iron, aluminum, and a magnesium for a carrying purpose. However, if the hollow coil antenna is disposed so as to contact the casing, the variance for the resonating frequency and the loss may increase greatly. Also, if the case is made from a plastic member and there is a disposition layer such as an aluminum, or a metal member such as an aluminum flake contained in a filling member or a painting layer, then a loss in the coil may increase greatly.

DISCLOSURE OF INVENTION

The present invention was made in consideration of the above problems. A main object of the present invention is to provide an RFID antenna. In particular, a main object of the present invention is to provide a reader/writer antenna which can restrict a variance of the resonating frequency and a loss even if the RFID antenna or the reader/writer antenna are disposed so as to contact a conductive member such as a metal casing.

In order to achieve the above object, the reader/writer antenna of the present invention is used in an RFID system for performing data communication in a non-contacting manner such that a flat soft magnetic member is disposed on a surface which is near the object of the antenna coil which is formed by a loop which has at least one turn.

Also, the reader/writer antenna of the present invention is used in an RFID system for performing data communication in a non-contacting manner such that a flat soft magnetic member is disposed on a surface which is near the object of the antenna coil which is formed by winding the antenna coil in a plain in a spiral manner.

In the present invention, the soft magnetic member is formed so as to overlap a part of the antenna coil when it is viewed from a direction which is orthogonal to an antenna surface of the antenna coil such that the magnetic flux which is generated by the antenna coil is formed in an asymmetric manner with reference to a center axis of the antenna coil.

Also, the reader/writer antenna of the present invention is used in an RFID system for performing data communication in a non-contacting manner such that an antenna coil is formed by winding a top surface and a back surface of the flat plate around a flat plate magnetic core which is made of a soft magnetic member.

Also, the reader/writer antenna of the present invention is used in an RFID system for performing data communication in a non-contacting manner such that an antenna coil is formed by winding a circumferential surface of a column around a columnar magnetic core which is made of a soft magnetic member.

In the present invention, it is preferable that a thickness of a soft magnetic member or a thickness of a plate magnetic core is set to be appeiximately 10 mm or thinner. Also, it is preferable that a thickness t for a soft magnetic member or magnetic core for the plate satisfies a relationship $S/L > t > S/(L/\mu)$ under condition that S indicates an area for the antenna coil, L indicates a circumferential length of the antenna coil, and $\mu$ indicates a magnetic transmittance ratio of the soft magnetic member.

Also, it is preferable that the soft magnetic member is a compound of either ametal powder. It is preferable that a flake or a ferrite powder which are formed by flattening a metal powder, and the metal powder is either one of a carbonyl iron powder, a rediced iron powder, an atomized powder, or an amorphous powder, Also, it is preferable that the metal powder or the flake is a flake which is made by flattening a water-atomized iron base alloy or an iron base alloy powder mechanically.

Also, in the present invention, it is preferable that the soft magnetic member is either one of an amorphous alloy, a permalloy, a magnetic steel, a silicon steel, a sendust alloy, a Fe—AL alloy, or a soft magnetic ferrite. Also, it is preferable that the soft magnetic member is an amorphous film or a layered member of the amorphous film.

Also, in the present invention, it is preferable that a non-magnetic conductive member of which resistivity is approximately $10 \times 10^{-8} \Omega m$ or lower or a conductive member of which resistivity is approximately $3 \times 10^{-8} \Omega m$ is disposed between the soft magnetic member and the object. Also, it is preferable that a non-magnetic conductive member which has a 0.015 Ω resistance which is more preferably 0.005 Ω or lower with 1 cm length, 1 cm width is disposed between the soft magnetic member and the object.

Also, the reader/writer of the present invention is formed by disposing the above reader/writer on a casing which is formed by a non-magnetic material member of which resistivity is approximately $10 \times 10^{-8} \Omega m$ or lower. Also, it is preferable that the case is formed by a conductive member which has a 0.015 Ω resistance which is more preferably 0.005 Ω or lower with 1 cm length, 1 cm width.

By doing this, in the present invention, a soft magnetic member which is made of a soft magnetic member which is formed by a layered member such as a composite which is formed by combining a metal powder member, a flake, or a ferrite and an organic member, a ferrite, an amorphous film or a layered member of amorphous film is disposed between the antenna coil for the reader/writer antenna and the conductive member such as a metal casing. By doing this, it is possible to transmit the magnetic flux which is generated by the antenna coil through the soft magnetic member; thus, it is possible to restrict the variance for the resonating frequency which is generated by an eddy current which is generated in the metal member and the loss. In particular, by using a composite which is formed by controlling a disposition direction of the flake, it is possible to form a thin soft magnetic member; thus, it is possible to dispose an antenna coil on a metal flat plate such as a casing.

Also, by inserting a conductive member which has a predetermined electric resistance between the soft magnetic member and a surface of the metal member, it is possible to restrict an inductance which is caused by a variety of a material member of the conductive member to which the antenna is disposed and a variance for the loss. Thus, it is always possible to obtain a stable antenna performance even in a case in which an antenna coil is disposed in any kinds of place.

Furthermore, if various radiowave leak from the electronic circuits of the reader/writer and such a leaking radiowave enters into the antenna, a disturbance such as a howling occurs. It is possible to seal such a leaking radiowave by inserting a conductive member between the antenna and the casing or by forming the casing by a metal member.

BEST MODE FOR CARRYING OUT THE INVENTIONS

In a preferable embodiment, an RFID reader/writer of the present invention is provided with a soft magnetic member which is formed by composite with approximately 100 mm thickness or thinner which is formed by a metal powder, a flake, a ferrite and an organic member, a ferrite etc., an amorphous film, or a layered member of an amorphous film between an antenna coil which is formed by at least one turn loop and a conductive object such as a metal casing for installing an antenna coil and a conductive member such as a metal plate of which resistivity is approximately $10 \times 10^{-8} \Omega m$ or smaller, more preferably, approximately $3 \times 10^{-8} \Omega m$ or smaller, or a resistance which has 1 cm length and 1 cm width has approximately 0.015 Ω or lower, more preferably 0.005 Ω or lower. It is possible to block the magnetic flux which enters into the conductive member by the soft magnetic member and the conductive member so as to restrict the influence thereof.

Also, it is possible to block a radiowave which leaks from an electronic circuit of the reader/writer effectively by the conductive member.

Figure 2A:
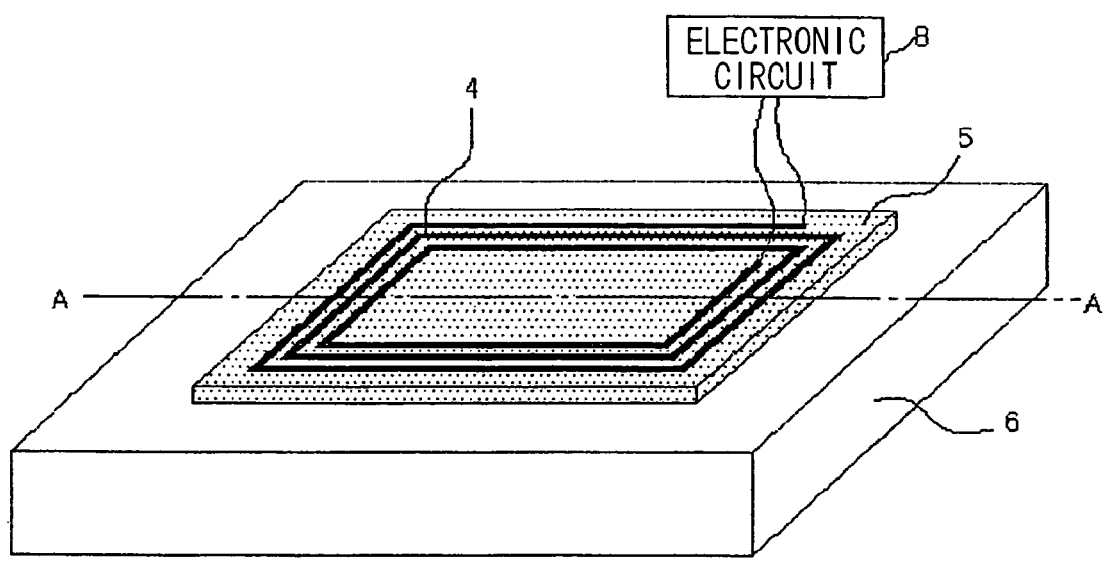
FIGS. 2A and 2B are views for showing a structure for a reader/writer antenna according to a first embodiment of the present invention in which only a soft magnetic member is disposed there.
Figure 2B:
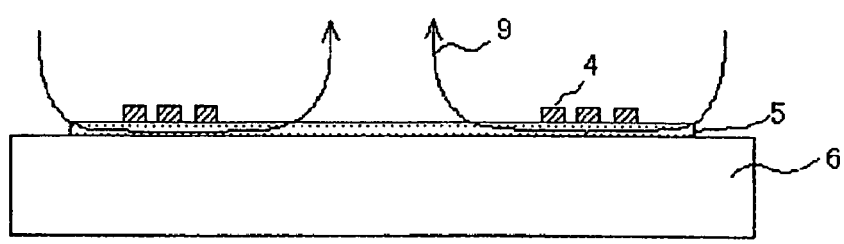

That is, as shown in FIGS. 2A and 2B, an antenna coil which is formed by a thin soft magnetic member 5 and a wound coil is disposed so as to contact a metal surface 6 of a member such as a casing. In such a usage condition, it is possible to avoid an undesirable influence by a member such as a casing or an electronic circuit by disposing a soft magnetic member 5 therebetween because the magnetic flux 9 which is generated by the antenna coil 4 passes through the soft magnetic member 5.

Figure 3A:
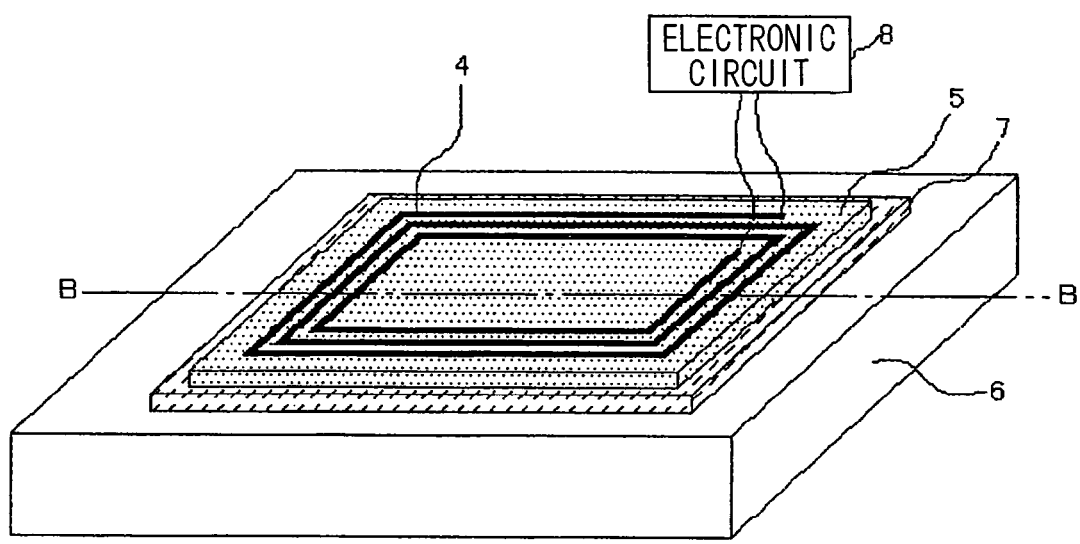
FIGS. 3A and 3B are views for showing a structure for a reader/writer antenna according to a first embodiment of the present invention in which a soft magnetic member and a conductive member are disposed there.
Figure 3B:
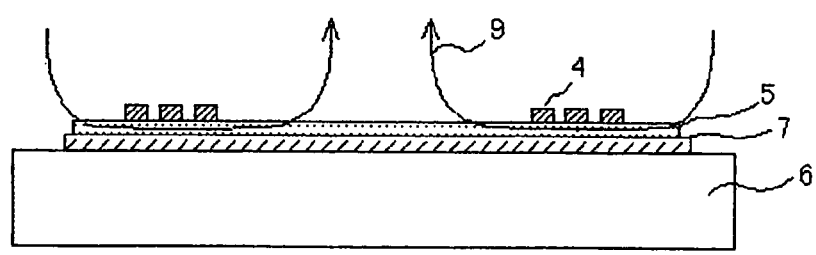

Furthermore, as shown in FIGS. 3A and 3B, it is possible to shield the magnetic flux which is generated in the antenna coil 4 completely by disposing a conductive member 7 which has a predetermined electric resistance which is made of a conductive aluminum plate or a copper plate between the soft magnetic member 5 and a metal surface 6 of the casing; thus, it is possible to avoid an undesirable influence of the metal surface 6 reliably. A loss by such a conductive member 7 which is formed by the conductive aluminum plate or a copper plate is very slight. It is possible to maintain a performance of the reader/writer antenna coil constantly with regardless to the member such as a metal surface 6 by selecting a capacity for a condenser of the electronic circuit 8 such that a resonating frequency should be optimum under condition that the conductive member 7 is included.

Also, if a member for the metal surface 6 such as a casing is used such as a non-magnetic aluminum plate, or a magnesium die-cast which has approximately $10 \times 10^{-8} \Omega m$ or lower, more preferably $3 \times 10^{-8} \Omega m$ or lower of resistivity, or a member which has 1 cm length and 1 cm width and approximately 0.015 $\Omega m$ or lower, or more preferably approximately 0.005 $\Omega m$ or lower is used, it is possible to omit the conductive member 7 by selecting the resonating frequency while contacting thereof.

Here, a transponder 2 is disposed under condition of a single piece; thus, it is possible to select the installation position randomly. The reader/writer 3 is disposed such that its main body and the antenna are disposed so as to be a pair. Therefore, a metal casing is used commonly for protecting the electronic circuit in the main body; thus, it is necessary to arrange a measure for preventing an undesirable influence to the antenna. Also, if a mobility for the RFID system 1 is important, a priority is on how the antenna should be installed because the transponder 2 is initially formed so as to be small and thin. However, the size of the reader/writer 3 has a minimum limit because it is necessary to build the electronic circuit therein. As explained above, a form of the transponder 2 and a form of the reader/writer 3 are different from each other; therefore, it is not possible to handle them as a same product. Therefore, it is necessary to use a specific structure for the reader/writer antenna. The above structure was produced in consideration of the above particular problems for the reader/writer.

Embodiments of the present invention are explained so as to further explain the embodiments of the above explained present invention.

EMBODIMENT 1

Figure 1:
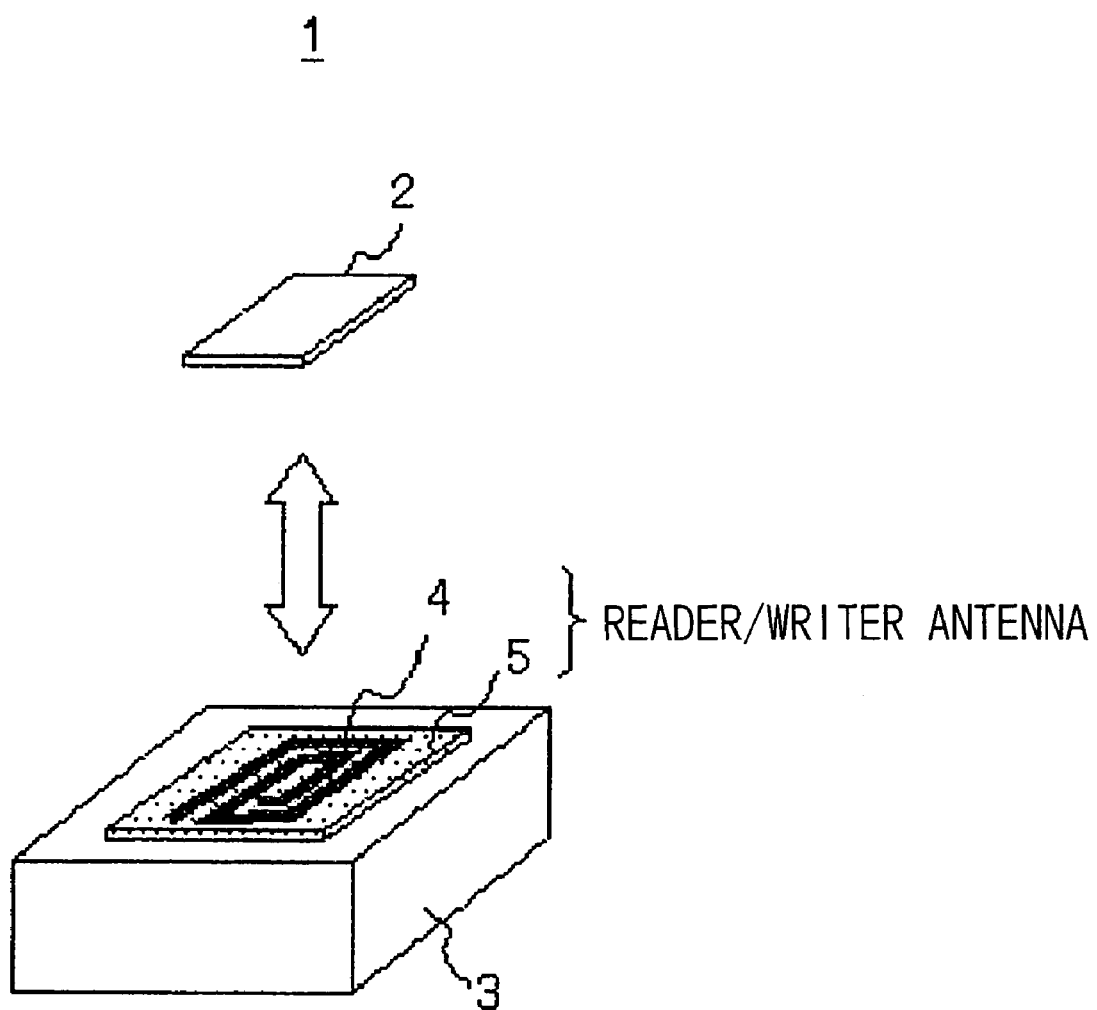
FIG. 1 is a view for showing a structure for an RFID system of the present invention.
Figure 4A:
FIGS. 4A and 4B are cross sections for showing a structure of a soft magnetic member graphically which is used for a reader/writer antenna according to the present invention.
Figure 4B:
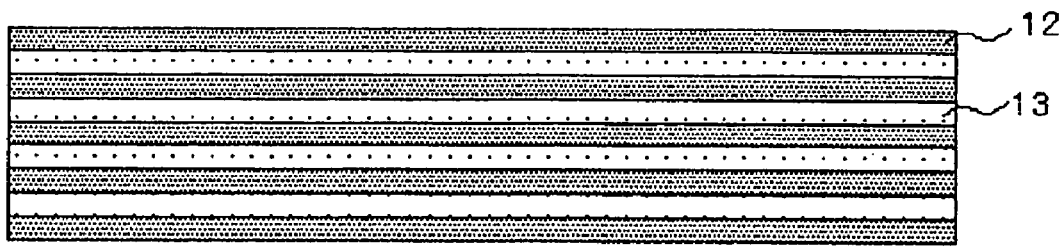
Figure 5A:
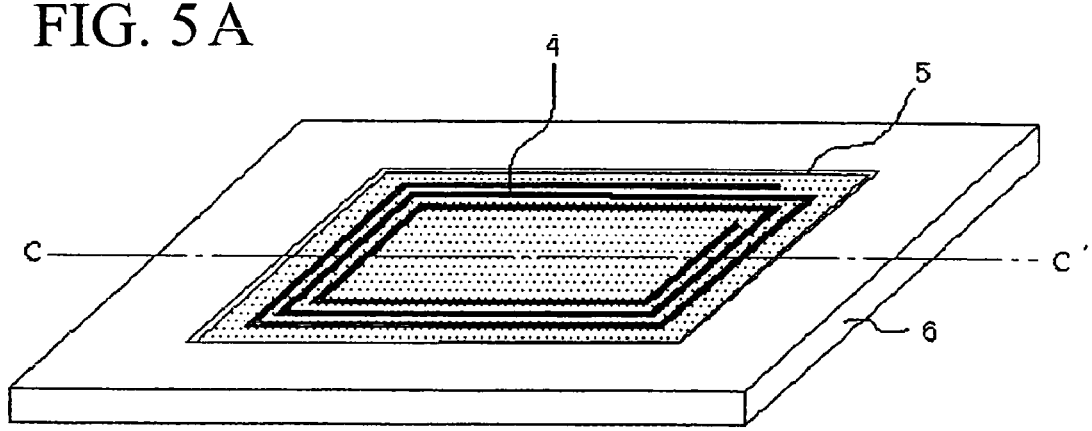
FIGS. 5A to 5D are views for showing a structure for a reader/writer antenna according to the first embodiment of the present invention.
Figure 5B:

First, a reader/writer antenna according to a first embodiment of the present invention is explained with reference to FIGS. 1A to 6B. FIG. 1 is a view for showing a structure of an RFID system of the present invention. FIGS. 2A to 3B are views for showing structures for the reader/writer antennas according to the first embodiment. FIGS. 2A and 3A are isometric views. FIGS. 2B and 3B are cross sections for them. Also, FIGS. 4A and 4B are cross sections for showing a structure for a soft magnetic member which is used for the reader/writer antenna according to the present embodiment. FIGS. 5A and 5B are views for showing other structure of the reader/writer antenna according to the present embodiment.

Figure 6A:
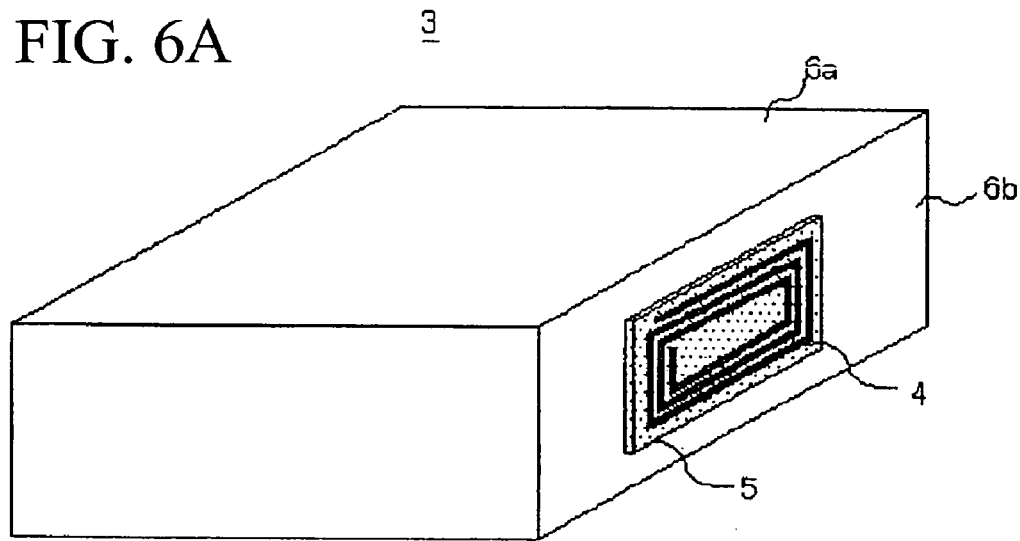
FIGS. 6A to 6B are views for showing a position for installing a reader/writer antenna according to the first embodiment of the present invention.
Figure 6B:
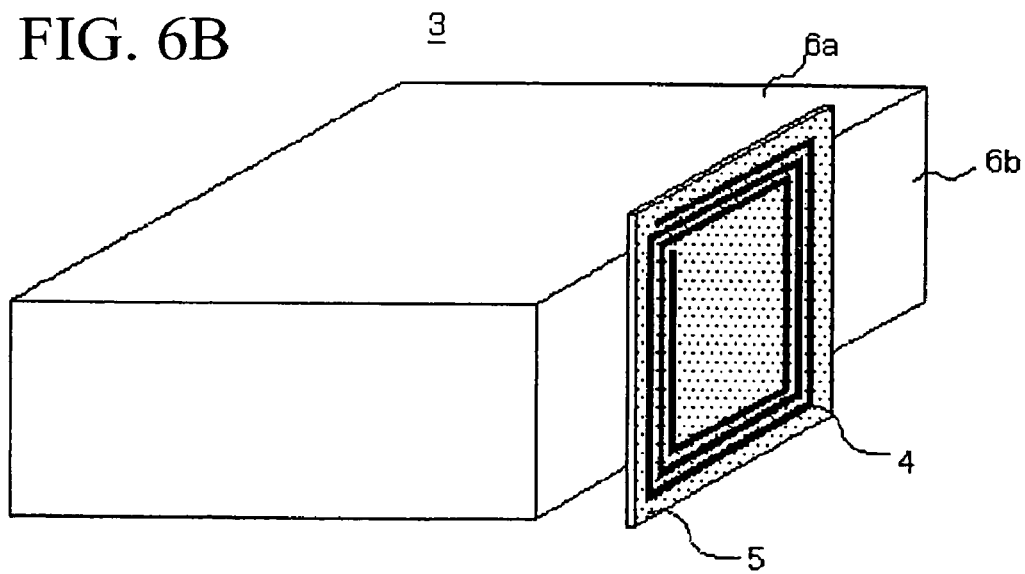

As shown in FIG. 1, the RFID system 1 is formed by a reader/writer 3 (or a reader, hereinafter called a reader/writer) for performing a datum communication by using the reader/writer antenna and a transponder 2 which has various shapes such as a label type, sheet type, or stick type. A communication circuit for converting a transmittance/receipt signal and an electronic circuit such as a calculating processing circuit for decoding a transmittance/receipt signal are built in the reader/writer 3. The reader/writer antenna is disposed on a metal surface such as a casing for containing these electronic circuits. Here, in FIG. 1, the reader/writer antenna is described in a center of the reader/writer surface 3 for better understanding the reader/writer antenna. However, such a structure is only an example. The size, and the installing position of the reader/writer antenna are random. For example, as shown in FIG. 6A, it is acceptable for installing it on a side metal surface 6b of the reader/writer 3. Also, it is acceptable to disposing the reader/writer antenna so as to expand over the metal surface.

FIGS. 2A and 2B show structures for the reader/writer antennae which are disposed on the metal surfaces. The soft magnetic member 5, which is formed by a predetermined material member according to a predetermined manufacturing method, is disposed between the antenna coil 4, which is formed by a wound coil both ends of which are connected to the electronic circuit 8, and the metal surface 6. The magnetic flux which is generated in the antenna coil 4 passes through the inside of the soft magnetic member 5 as shown in FIG. 2B while most of the magnetic flux does not reach to the inside of the metal surface 6. Therefore, it is possible to restrict a variance and increase of the resonating frequency which is caused by an eddy current which is generated in the metal.

Here, in the drawings, the electronic circuit 8 which is connected to the antenna coil 4 and the metal surface 6 are described separately. However, it is acceptable the metal surface may be a surface of a casing of the reader/writer 3 for containing the electronic circuit 8 or a surface of the casing of a device for building the reader/writer 3 therein. Also, the metal surface 6 which are shown in FIGS. 2A and 2B show a part of a surface of a conductive member such as a metal casing graphically. Thickness and shape for the metal surface 6 are not limited to the drawings which are shown there. It is acceptable if the metal surface 6 contains a desirable metal material member such as an iron, aluminum, and magnesium. Also, a structure is acceptable in which a metal deposition layer is formed for an insulating material member or a metal material member is contained in a filling member and a painting layer.

Also, a structure is shown in the drawings in which a rectangular antenna coil 4 are wound three times. However, the structure for the antenna coil 4 is not limited to the above structure. Any structure is acceptable as long as the antenna coil 4 is wound in a spiral manner in a plain which is approximately parallel to the metal surface 6. The size, shape, winding number, and a line width can be set appropriately in consideration of a required performance for the reader/writer 3. For a method for forming such antenna coil 4, it is possible to use any desirable method for a structure in which a conductive member of which surface is coated by an insulating layer is attached to a base plate or a metal layer is formed such as an aluminum film or a copper film o a base plate such as an insulating film so as to form a spiral coil by an etching method or a punching method.

Also, the soft magnetic member 5 may be a composite of a powder member or a flake, plastic, and an organic member such as a rubber, or an amorphous alloy, a permalloy, electromagnetic steel, a silicon iron, sendust alloy, rapid coagulating agent of Fe—Al alloy or soft magnetic ferrite, a cast member, a rolled stripped member, forged member, or a sintered member, an amorphous film or a layered member of the amorphous film, a metal powder, carbonyl iron powder, a reduced iron powder, atomized powder (iron which contains a pure iron, Si, Cr, Al etc. or Al, permalloy, Co—Fe, etc.) amorphous powder (a member which is produced by performing a water-atomizing operations for iron which contains B, P, Si, Cr and Co, Ni), or a painting layer of a painting member which contains the above powder or the flake.

Here, an ordinary silicon iron contains 5 w % of silicon or lower such that the resistivity is $67 \times 10^{-8}$ $\Omega$m or lower. If more silicon is contained, the resistivity increases; thus, a loss decreases. However, problems occur such as a segregation in a casting operation, a crack in a casting operation, or an excessive hardness for a roll stripping operation. If a powder is produced according to a water-atomizing method such that the silicon is contained there by 6 w % or higher, a fine melt powder is cooled rapidly; therefore, there is not a problem such as a segregation. Also, such a fine organization is not fragile; thus, it is possible to flatten mechanically. Such a flattening operation is performed by a device such as a ball mill, and an attritor. If the silicon increases, the resistivity increases; thus, the loss decreases. Also, viscosity of the melt metal decreases; thus it is possible to obtain a fine powder by performing a water-atomize method. If it exceeds 15 w %, there occurs a problem in that a saturated magnetic flux density decreases. Therefore, it is preferable that the silicon should be contained therein by 6 w % to 15 w %.

Also, the contents for various metal members which are contained in the iron base alloy are set in consideration of following points.

Al; Although if the contents increases, there is an effect for increasing the resistivity, the viscosity of the melt metal increases; thus 1 w % is preferable or lower.

Cu, Ni; Although if the contents increases, the hysteresis loss decreases, if the contents exceeds 3 w %, the saturated magnetic flux density decreases; therefore, 3 w % is preferable or lower.

Cr; If the contents increase, the resistivity increases; thus, the loss is reduced. Also, there is an effect for enhancing a resistance for an oxidization in a high temperature condition. If the contents exceeds 5 w %, the saturated magnetic flux density decreases; therefore, 5 w % is preferable or lower.

Co; if the contents increases, the saturated magnetic flux density increases. If the contents exceeds 10 w %, the saturated magnetic flux density does not increase; therefore, 10 w % is preferable or lower.

For a method for producing the above composite member, it is possible to name an injection molding method, a painting method, a compressing molding method, and a roll stripping method. A soft magnetic member 5 which is formed by an injection molding method or a compressing molding method has a characteristic in that it is so rigid that it is hardly broken even if it is formed thinner. In case of a painting method, it is possible to form by forming a flake by flattening a grain powder member by ah attritor, a ball mill, and a stamping mill and repeating a painting/drying operation of a painting member which contains the flake or the grain powder member on a film. In such operations, it is possible to dispose the flake in a constant direction by charging a magnetic field during the painting operation; thus, it is possible to enhance the characteristics.

For a plastic member in the composite member, it is possible to use a plastic member which has a desirable thermoplasticity because of its desirable formability or a plastic member which has a desirable heat-resistance because of its thermosetting characteristics. Also, it is possible to use a resin such as an acrylic member which has an insulating characteristics, a polyester, polyvinyl chloride, polyethylene, polystylene, and epoxy.

For such above material members and methods can be selected according to a performance which is required for the reader/writer antenna coil. For example, in case for a composite member, it has a structure shown in FIG. 4A such that a powder member and a flake 10 are dispersed in a resin binder 11 such as a plastic member or a rubber. Such a powder member or the flake 10 are insulated mutually; therefore, an entire soft magnetic member 5 does not have a conductivity. Therefore, it is possible to reduce a loss which is caused by an eddy current even if it receives a high frequency radio wave. Thus, such a member is desirable for a member which is used in a structure of the present invention. Also, in case for a layered member of an amorphous layer, the amorphous layer 12 and the insulating layer 13 are layered alternately as shown in FIG. 4B. There is a problem in which although it is easy to produce it, a loss in the amorphous layer 12 is great.

Here, experiments are performed so as to compare effects among a case in which a member which is dispersed in the composite member is formed in a powder condition and a case in which the member which is dispersed in the composite member is formed in a flattened condition (flake) and a case in which a magnetic field is applied in a process for dispersing and disposing a flake. In the experiments, an antenna coil 4 which has 47×17 mm size with a winding number 5 is disposed so as to sandwich the soft magnetic member 5 which is formed by the composite member on an aluminum coil so as to measure the characteristics thereof (inductance L and Q). Results of the experiments are shown in TABLE 1. According to the TABLE 1, it is understood that it is possible to improve the inductance in a wide frequency range by forming the dispersing member in a flake condition. Furthermore, it is possible to increase a value Q in a frequency range near 13.56 MHz greatly by applying a magnetic field in a dispersing operation so as to dispose the flake 10. Thus, it is understood that a structure in which the flake 10 is disposed as shown in FIG. 4A is the most superior from a characteristics point of view.

TABLE 1

| Frequency (MHz) | Flake | | | | Powder in grain condition | |
| --- | --- | --- | --- | --- | --- | --- |
| | Under magnetic field | | Not under magnetic field | | Not under magnetic field | |
| | L (µH) | Q | L (µH) | Q | L (µH) | Q |
| 1 | 1.076 | 5.7 | 1.080 | 6.0 | 0.734 | 3.8 |
| 3 | 1.055 | 13.7 | 1.047 | 13.4 | 0.666 | 9.3 |
| 5 | 1.053 | 19.5 | 1.035 | 19.2 | 0.654 | 13.4 |
| 10 | 1.072 | 28.4 | 1.046 | 23.3 | 0.647 | 21.3 |
| 13.56 | 1.099 | 30.7 | 1.069 | 22.2 | 0.650 | 25.5 |
| 15 | 1.113 | 29.8 | 1.081 | 21.0 | 0.652 | 26.1 |
| 20 | 1.174 | 24.7 | 1.128 | 15.1 | 0.661 | 28.5 |

Also, it is necessary to have a thickness of the soft magnetic member 5 such that the magnetic flux which is generated by the antenna coil 4 can be introduced effectively. However, the thickness of the soft magnetic member should be as thin as possible so as to restrict a protrusion of the antenna coil 4 when the antenna coil 4 is disposed on a metal surface 6. If the thickness of the soft magnetic member 5 exceeds 10 mm, the antenna protrudes; therefore, such a condition is not appropriate for a mobile apparatus. On the other hand, it is difficult to obtain a magnetic core which has 0.02 mm thickness or thinner. Even if it is possible to obtain it, a characteristic is unstable. Also, if the thickness of the soft magnetic member 5 is set to be 0.02 mm, there is not an influence for an antenna characteristic and mobility. By judging the above conditions integrally, the range for the thickness of the soft magnetic member 5 is preferably 10 mm or thinner. More preferably, it should be between 0.02 mm and 10 mm.

Figure 15A:
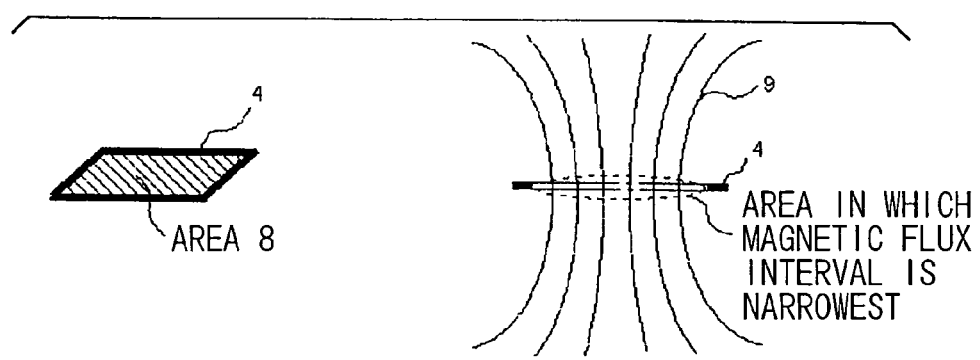
FIGS. 15A and 15B are views for showing a condition of the magnetic flux both in a conventional structure and the structure of the present invention in which a soft magnetic member is sandwiched.
Figure 15B:
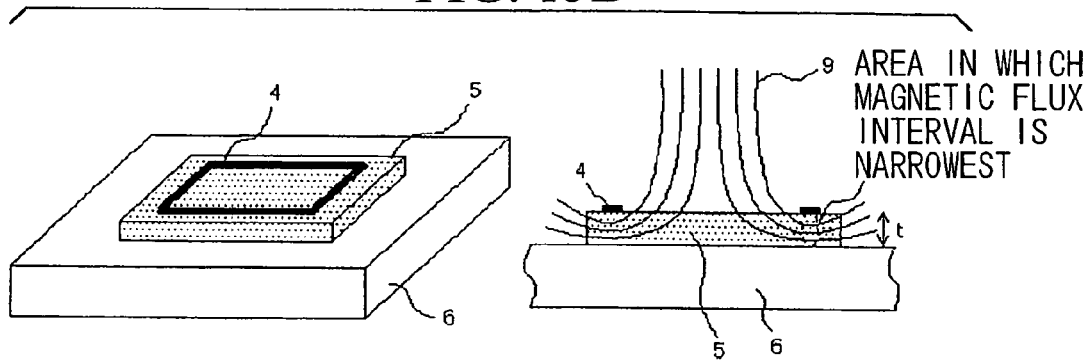
Figure 16A:
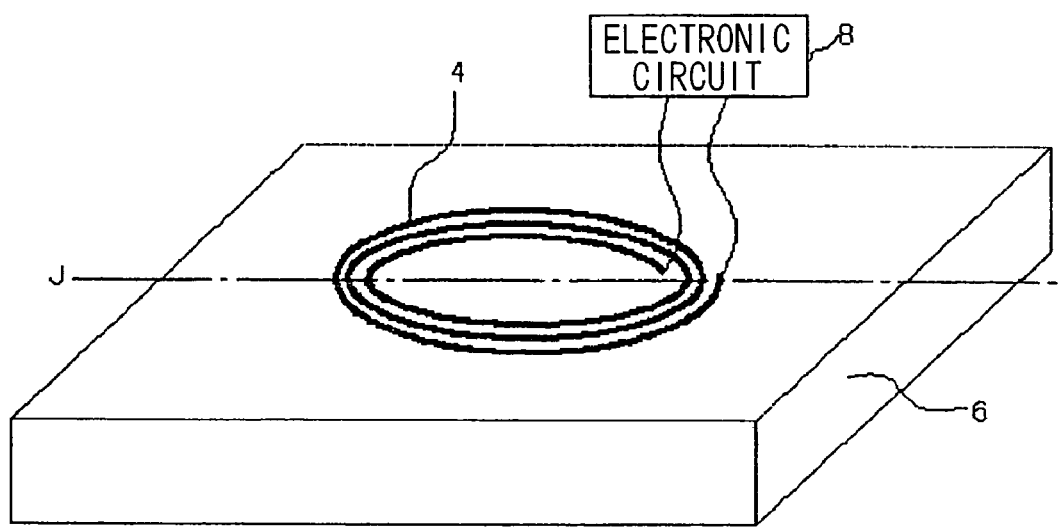
FIGS. 16A and 16B are views for showing a structure for a conventional reader/writer antenna.
Figure 16B:
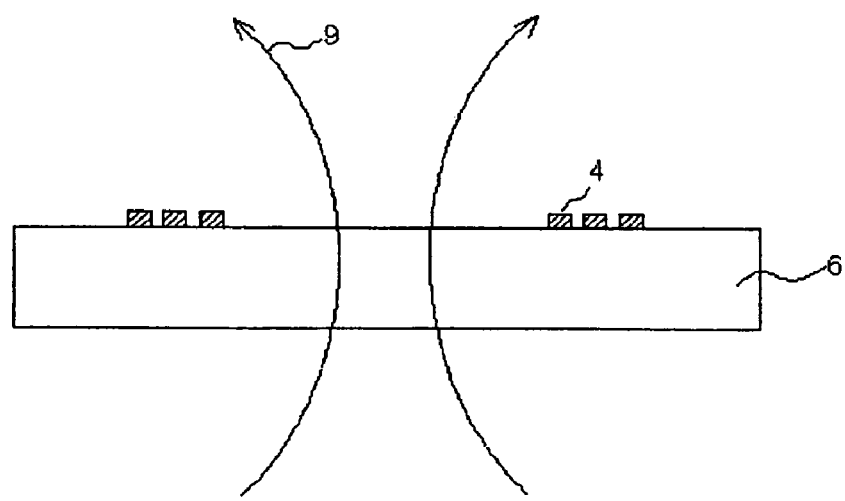

Also, it is possible to define the thickness (t) of the soft magnetic member 5 by using an area (S) for the antenna coil 4, a circumference length (L) of the antenna coil 4, and a magnetic permeability (μ) of the soft magnetic member 5. With reference to the drawings, as shown in FIG. 15A, if the antenna coil 4 is disposed in a single manner such that there are not any members such as a conductive member therearound that interrupt the magnetic flux, the area through which the magnetic flux 9 passes in which the interval of the magnetic flux is the narrowest is indicated by the area (S) which is surrounded by a conductive member of the antenna coil 4. Also, as shown in FIG. 15B, an area through which the magnetic flux 9 passes which has the narrowest interval for the magnetic flux is indicated by the area between the wound wire of the antenna coil 4 and the conductive member (metal surface 6) under condition that the antenna coil 4 is disposed in parallel with the conductive member such as the metal surface 6. In this area, a circumference length of the antenna coil 4 is L×t under condition that an interval between the antenna coil 4 and the metal surface 6 is t. If such an area is equal to the area S of the antenna coil 4 or greater, the magnetic flux can pass there even if there is a conductive member as similarly to a case of a single coil. That is, it is acceptable even if there is not a soft magnetic member 5. Here, a purpose for using the soft magnetic member 5 is to reduce the protrusion of the antenna coil 4 from the metal surface 6 so as to facilitate the mobility; therefore, if the thickness of the soft magnetic member 5 exceeds it, there is not an advantage for using the soft magnetic member 5. Therefore, there is not an advantage for using the soft magnetic member 5 unless there are relationships such as S>L×t, that is S/L>t.

Also, if the soft magnetic member 5 is disposed, the amount of the magnetic flux which passes there is proportional to a magnetic transmittance ratio. In other words, the area between the metal surface 6 and the antenna coil 4 is substantially μ×L×t. If such a substantial area is greater than S, the magnetic flux 9 can pass through between the metal surface 6 and the antenna coil 4 easily. Therefore, it is acceptable if there are relationships such as S<μ×t, that is t>S/(L×μ). According to the above results, it is possible to understand that the thickness t of the soft magnetic member 5 should preferably be in a range of S/L>t>S/(L×μ).

By disposing the soft magnetic member 5 which is formed by such a material member, manufacturing method, and the thickness between the antenna coil 4 and the metal surface 6, it is possible to restrict an influence by the eddy current which is generated on the metal surface 6. Also, it is possible to dispose the reader/writer antenna on the metal casing directly; thus, it is possible to enhance a flexibility for a product design.

Also, if it is not certain on which material member of the metal surface 6 the annenna is disposed, for example, as shown in FIGS. 3A and 3B, by disposing the conductive member 7 which is made of a predetermined material member and has a predetermined thickness between the soft magnetic member 5 and the metal surface 6, it is possible to stop the magnetic flux 9 which is generated by the antenna coil 4 so as to permeate through the soft magnetic member 5 by the conductive member 7; thus, it is possible to prevent the influence of the metal surface 6 therebeneath reliably.

For more specific explanation, if the material member for the metal surface 6 on which the antenna coil 4 is disposed is specified, it is possible to evaluate the influence of the metal surface 6 in advance. However, if the material member is not specified, the influence varies according to the material member. Here, an optimum Q for the antenna is determined by designing an electric circuit so as to lower Q by forming a lead wire more fine width. However, it is difficult to increase Q. Therefore, if the material member for a metal member which forms the metal surface 6 is not specified, Q varies greatly; thus, there is a case in which it is not possible to adjust it at an optimum value. Here, if a conductive member 7 is disposed beneath a layer of the soft magnetic member 7 in advance, it is possible to maintain Q within a predetermined range with regardless to the member for forming the metal surface 6; thus, it is possible to set Q at an optimum value.

In such a case, it is necessary to set an electric resistance in the conductive member 7 at a predetermined value because it is necessary to block the magnetic flux reliably and maintain the loss of Q which is caused by the conductive member 7 within an adjustable range. Here, the Inventor of the present Patent Application calculated the variance in Q of the antenna coil under condition that a resistivity r of the sample in which 7 μm thickness foil is used varies. Results of the experiments are shown in TABLE 2.

TABLE 2

| r (×10$^{-8}$ Ω cm) | Q |
|---|---|
| 1.6 | 13.65 |
| 2.4 | 11.95 |
| 5 | 8.573 |
| 6 | 7.768 |
| 7 | 7.121 |
| 8 | 6.593 |
| 9 | 6.156 |
| 10 | 5.79 |
| 15 | 4.64 |
| 20 | 4.095 |
| 25 | 3.84 |
| 30 | 3.743 |
| 35 | 3.741 |

Here, the voltage for L or C during the resonation is Q in a power supply voltage; therefore, it is necessary to set Q at a certain value. That is, it is necessary to set Q at least 5 or greater. More commonly, it is necessary to set Q at 10 or greater. Therefore, the Q cannot use the antenna which has a value 5 or fewer. If the value is equal to 10 or greater, it is possible to use in many antennae. In addition, in order to set the Q value to be 5 or greater, more preferably to be 10 or greater, according to the TABLE 2 in which a foil which has 7 μm thickness is used, it is possible to determine that the resistivity should be approximately 10×10$^{-8}$Ωcm or fewer, more preferably 3×10$^{-8}$Ωcm or fewer. For a metal member which satisfies such a resistance condition, it is possible to name a pure copper, aluminum, brass, aluminum bronze, platinoid, titanium, SUS304, and inconel. By forming the conductive member 7 by using these material members, it is possible to prevent the influence of the metal surface 6 completely while restricting the loss in Q. In contrast, if the metal surface 6 is formed by a material member which satisfies the above condition, it is possible to omit the conductive member 7.

In the TABLE 2, explanations are made for a preferable resistivity in which a foil which has 7 μm thickness. If the thickness of the foil is thicker, the resistance in the conductive member 7 decreases and the loss in Q decreases. In TABLE 3, a resistance (Ω) is shown in a longitudinal direction of 1 cm length and 1 cm width under condition that the thickness of the foil in the TABLE 2 is varied. According to the TABLE 3, if the thickness of the foil varies, the preferable range for the resistivity varies accordingly. That is, if the thickness of the foil increases, an upper limit value for the resistivity increases.

TABLE 3

| Resistivity of material member ×E-8 Ω m | Thickness of conductive member (μm) | | | | | | | |
|---|---|---|---|---|---|---|---|---|
| | 7 | 30 | 50 | 100 | 200 | 300 | 400 | 500 |
| 1.6 | 0.0020 | 0.0010 | 0.0000 | 0.0000 | 0.0000 | 0.0000 | 0.0000 | 0.0000 |
| 2.4 | 0.0030 | 0.0010 | 0.0000 | 0.0000 | 0.0000 | 0.0000 | 0.0000 | 0.0000 |
| 5 | 0.0070 | 0.0020 | 0.0010 | 0.0010 | 0.0000 | 0.0000 | 0.0000 | 0.0000 |
| 6 | 0.0090 | 0.0020 | 0.0010 | 0.0010 | 0.0000 | 0.0000 | 0.0000 | 0.0000 |
| 7 | 0.0100 | 0.0020 | 0.0010 | 0.0010 | 0.0000 | 0.0000 | 0.0000 | 0.0000 |
| 8 | 0.0110 | 0.0030 | 0.0020 | 0.0010 | 0.0000 | 0.0000 | 0.0000 | 0.0000 |
| 9 | 0.0130 | 0.0030 | 0.0020 | 0.0010 | 0.0000 | 0.0000 | 0.0000 | 0.0000 |
| 10 | 0.0140 | 0.0030 | 0.0020 | 0.0010 | 0.0010 | 0.0000 | 0.0000 | 0.0000 |
| 15 | 0.0210 | 0.0050 | 0.0030 | 0.0020 | 0.0010 | 0.0010 | 0.0000 | 0.0000 |
| 20 | 0.0290 | 0.0070 | 0.0040 | 0.0020 | 0.0010 | 0.0010 | 0.0010 | 0.0000 |
| 25 | 0.0360 | 0.0080 | 0.0050 | 0.0030 | 0.0010 | 0.0010 | 0.0010 | 0.0010 |
| 30 | 0.0430 | 0.0100 | 0.0060 | 0.0030 | 0.0020 | 0.0010 | 0.0010 | 0.0010 |
| 35 | 0.0500 | 0.0120 | 0.0070 | 0.0040 | 0.0020 | 0.0010 | 0.0010 | 0.0010 |
| 40 | 0.0570 | 0.0130 | 0.0080 | 0.0040 | 0.0020 | 0.0010 | 0.0010 | 0.0010 |
| 50 | 0.0710 | 0.0170 | 0.0100 | 0.0050 | 0.0030 | 0.0020 | 0.0010 | 0.0010 |
| 60 | 0.0860 | 0.0200 | 0.0120 | 0.0060 | 0.0030 | 0.0020 | 0.0020 | 0.0010 |
| 70 | 0.1000 | 0.0230 | 0.0140 | 0.0070 | 0.0040 | 0.0020 | 0.0020 | 0.0010 |
| 80 | 0.1140 | 0.0270 | 0.0160 | 0.0080 | 0.0040 | 0.0030 | 0.0020 | 0.0020 |
| 90 | 0.1290 | 0.0300 | 0.0180 | 0.0090 | 0.0050 | 0.0030 | 0.0020 | 0.0020 |
| 100 | 0.1430 | 0.0330 | 0.0200 | 0.0100 | 0.0050 | 0.0030 | 0.0030 | 0.0020 |
| 150 | 0.2160 | 0.0500 | 0.0300 | 0.0150 | 0.0080 | 0.0050 | 0.0040 | 0.0030 |
| 200 | 0.2180 | 0.0670 | 0.0400 | 0.0200 | 0.0100 | 0.0070 | 0.0050 | 0.0040 |

Here, the resistance (the resistance in a longitudinal direction of the sample which has 1 cm width, 1 cm length) and Q are measured for the above material member under condition that the thickness is varied. Results of the experiments are shown in TABLE 4. Also, the resistivity and the organization for each material member is shown in TABLE 5.

TABLE 4

| Conductive member | Thickness of conductive member (μm) | | | | | | | | | |
|---|---|---|---|---|---|---|---|---|---|---|
| | 7 | | 30 | | 50 | | 100 | | 200 | |
| | R | Q | R | Q | R | Q | R | Q | R | Q |
| Pure copper | 0.0023 | 13.7 | 0.0005 | 14.5 | 0.0003 | 14.8 | 0.0002 | 15.1 | 8E-05 | 15.4 |
| Aluminum | 0.0034 | 12 | 0.0008 | 13.9 | 0.0005 | 14.4 | 0.0002 | 15 | 0.0001 | 15.4 |
| Brass | 0.0089 | 6.2 | 0.0021 | 12.6 | 0.0012 | 13.1 | 0.0006 | 14 | 0.0003 | 14.8 |
| Aluminum bronze | 0.0143 | 4.5 | 0.0033 | 11.5 | 0.001 | 15.5 | 0.001 | 15.6 | 0.0005 | 14.5 |
| Platinoid | 0.0274 | 3.9 | 0.0064 | 7.3 | 0.0038 | 9.9 | 0.0019 | 12.3 | 0.001 | 14 |
| Titanium | 0.0686 | 3.8 | 0.016 | 4.8 | 0.0098 | 5.9 | 0.0048 | 8.2 | 0.0024 | 13.5 |
| SUS304 | 0.1 | 3.8 | 0.0233 | 4 | 0.014 | 4.9 | 0.007 | 7.2 | 0.0035 | 12 |
| Inconel | 0.1471 | 3.8 | 0.0343 | 3.9 | 0.0206 | 4 | 0.0103 | 4.9 | 0.0052 | 8.6 |

R indicates Resistance

☐ indicates an area in which Q is 10 or greater

▨ indicates an area in which Q is 5 or greater

TABLE 5

| | Resistivity (×10⁻⁸ Ω cm) | Organization |
|---|---|---|
| Pure copper | 1.6 | Cu |
| Aluminum | 2.4 | Al |

TABLE 5-continued

| | Resistivity ($\times 10^{-8}$ Ω cm) | Organization |
|---|---|---|
| Brass | 6.2 | 30% Zn Rest of them Cu |
| Aluminum bronze | 10 | 5% AL Rest of them Cu |
| Platinoid | 19.2 | 20% Zn—15% Ni Rest of them Cu |
| Titanium | 48 | Ti |
| SUS304 | 70 | 18% Cr—8% Ni Rest of them Fe |
| Inconel | 103 | 16% Cr—6% Fe Rest of them Ni |

According to the TABLE 4, it is understood that the Q increases according to the increase in the thickness of the conductive member 7, that is, the decrease in the resistance; thus, it is possible to realize a greater effect for restricting the influence by the metal surface 6. Here, in order to set Q to be 5 or greater (indicated by a gray hatching section), it is acceptable if the resistance in the longitudinal direction of the above 1 cm width and the above 1 cm length should be 0.015 Ω or lower in accordance with 0.0143 of the aluminum bronze. Furthermore, in order to set Q to be 10 (in a section surrounded by a broad line), it is acceptable if the above resistance should be approximately 0.005 Ω or lower in accordance with 0.0035 of the SUS304 and 0.0033 of the aluminum bronze.

In order to confirm the effect in the above explained structure, a reader/writer antennae are produced which have a structure shown in FIG. 2 in which the soft magnetic member 5 is disposed therein and a structure shown in FIG. 3 in which the soft magnetic member 5 and the conductive member 7 are disposed therein. Inductance and Q only for the coil, and the inductance and Q for cases in which they are disposed on an aluminum plate, an iron plate, and a stainless steel plate respectively are measured. Also, for the purpose of the comparison, the measurement was performed for an antenna coil which has a conventional structure in which the soft magnetic member 5 and the conductive member 7 are not disposed. The result is shown in TABLES 6 and 7.

Furthermore, the inductance decreases to some extent by disposing the conductive member 7 therebetween. However,

TABLE 6

| | Category | Eccentricity | Conductive member | FIG. | Only coil L (μH) | Only coil Q | On aluminum plate L (μH) | On aluminum plate Q | On iron plate L (μH) | On iron plate Q | On stainless steel plate L (μH) | On stainless steel plate Q |
|---|---|---|---|---|---|---|---|---|---|---|---|---|
| Comparison Example | Hollow core | | None | 11 | 4.90 | 98 | 1.55 | 23.2 | 1.92 | 5.0 | 1.63 | 11.9 |
| Embodiment 1 | Hollow core, Magnetic plate | None | None | 2 | 7.19 | 75 | 6.28 | 61.1 | 6.54 | 42.2 | 6.46 | 57.7 |
| | Hollow core, Magnetic plate | None | Disposed | 3 | 6.26 | 62 | 6.21 | 63.1 | 6.52 | 60.2 | 6.13 | 59.9 |
| Embodiment 2 | Hollow core, Magnetic plate | Eccentric | None | 5 | 6.92 | 62 | 6.01 | 63.3 | 6.27 | 60.5 | 6.20 | 60.2 |
| | Hollow core, Magnetic plate | Eccentric | Disposed | 6 | 6.00 | 63 | 5.95 | 63.5 | 6.25 | 60.8 | 5.86 | 60.5 |
| Embodiment 3 | Wound type | | None | 7 | 6.39 | 99 | 5.69 | 74.0 | 5.65 | 28.8 | 5.72 | 55.8 |
| | Wound type | | Disposed | 8 | 5.45 | 74 | 5.79 | 71.7 | 5.59 | 74.1 | 5.64 | 74.1 |

TABLE 7

| | Category | Eccentricity | Conductive member | Only coil | On aluminum plate | On iron plate | On stainless steel plate |
|---|---|---|---|---|---|---|---|
| Comparison Example | Hollow core | | None | ○ | X | X | X |
| Embodiment 1 | Hollow core, Magnetic plate | None | None | ○ | Δ | Δ | Δ |
| | Hollow core, Magnetic plate | None | Disposed | ○ | ○ | ○ | ○ |
| Embodiment 2 | Hollow core, Magnetic plate | Eccentric | None | ○ | Δ | Δ | Δ |
| | Hollow core, Magnetic plate | Eccentric | Disposed | ○ | ○ | ○ | ○ |
| Embodiment 3 | Wound type | | None | ○ | Δ | Δ | Δ |
| | Wound type | | Disposed | ○ | ○ | ○ | ○ |

According to the TABLES 6 and 7, it is understood that the inductance increases by disposing the soft magnetic member 5 therebetween so as to restrict the generation of the eddy current if the measurement is performed only for the coil. Also, if they are disposed on each metal plate, the inductance decreases greatly in a conventional structure shown in the comparison example. In contrast, in the structure of the present embodiment in which the soft magnetic member 5 is disposed therebetween, it is understood that the inductance hardly decreases, and also, the variance of Q is slight.

the variance of Q is approximately constant with regardless to the material member for the metal surface 6 as a ground layer. Thus, it is understood that it is possible to restrict Q in an adjustable range even if any member is used for the metal surface 6 on which the antenna coil 4 is disposed.

Figure 5C:
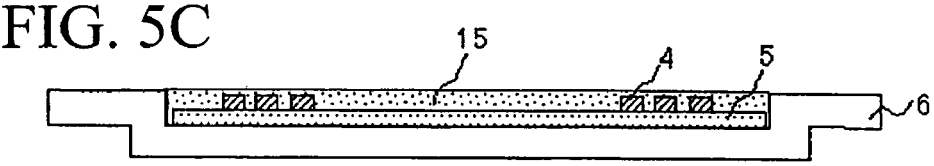
Figure 5D:
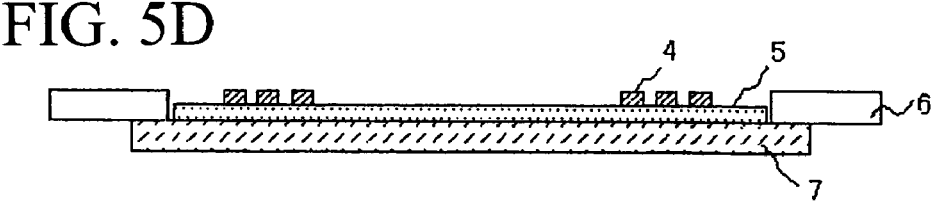

Here, in FIGS. 1 to 3B, explanations are made for structures in which the reader/writer antennae are disposed on the flat metal surface 6. However, for a case in which there is a disadvantage if the reader/writer antenna protrudes from the metal surface 6, as shown in FIGS. 5A and 5b, a concave section is formed on the metal surface 6 in advance; thus, the reader/writer antenna is disposed in the concave section so as to avoid the protrusion therefrom. Also, as shown in FIG. 5C, it is possible to protect the antenna by covering a surface of the reader/writer antenna by a protection sheet 15. Furthermore, as shown in FIG. 5D, it is possible to attach the conductive member 7 which is attached to the reader/writer antenna on the metal surface 6 so as to use the conductive member 7 for a part of the casing.

SECOND EMBODIMENT

Next, a reader/writer antenna according to a second embodiment of the present invention is explained with reference to FIGS. 7A to 8B. FIGS. 7A to 8B are views for showing a structure for a reader/writer antenna according to the second embodiment of the present invention. Here, the present embodiment is characterized in that the soft magnetic member is disposed in a part between the antenna coil and the metal surface; thus, the structure, the material member, and the manufacturing method therefore are the same as those in the above explained first embodiment.

Figure 7A:
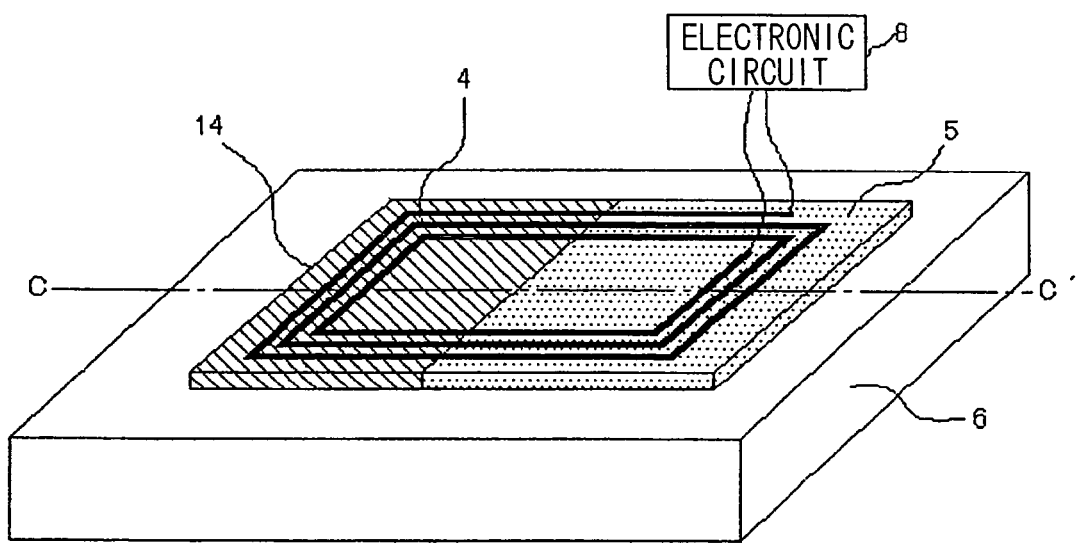
FIGS. 7A and 7B are views for showing a structure for a reader/writer antenna according to a second embodiment of the present invention in which a soft magnetic member and a spacer are disposed there.
Figure 7B:
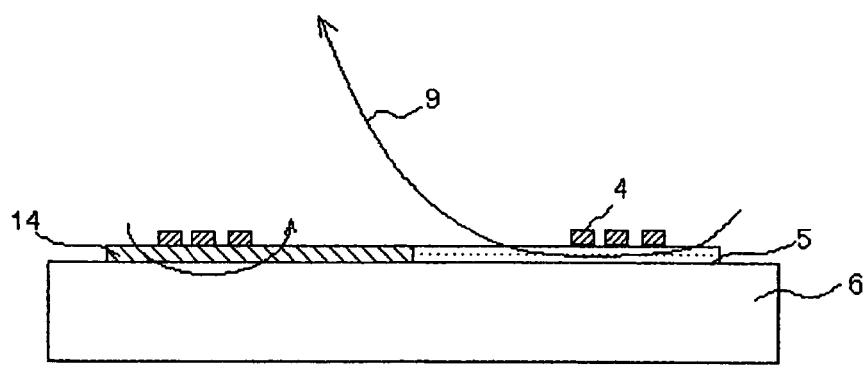

As shown in FIGS. 7A and 7B, in the reader/writer antenna according to the present embodiment, a soft magnetic member 5 which is formed by the material member and the manufacturing method which are shown in the first embodiment is disposed in a part between the antenna coil 4 and the metal surface 6, and a spacer 14 for adjusting the thickness is disposed in other sections. In such a structure, a symmetry of the magnetic flux 9 which is generated by the antenna coil 4 is not obtained. The magnetic flux 9 is great in a section in which the soft magnetic member 5 is disposed (a right-hand side of the drawing for the viewer), and the magnetic flux 9 passes through an inside of the soft magnetic flux 5 so as to disperse in an slanted direction as shown in FIG. 7B. Therefore, by adjusting the disposition position, the area of the soft magnetic member 5, it is possible to control the dispersion of the magnetic flux 9. For example, in a case in which the transponder 2 is disposed nearer to the surface on which the antenna is installed by a predetermined angle, it is possible to maintain the transmission condition desirably between the reader/writer 3 and the transponder 2.

Here, any member can be used for the spacer 14 as long as it is not magnetic or it has a different magnetic characteristics from that of the magnetic member 5. For such a member, it is possible to use an organic member such as a plastic member or a rubber member. Also, as shown in FIG. 8, it is acceptable if the conductive member 7 which is shown in the first embodiment is disposed between the soft magnetic member 5, the spacer 14, and the metal surface 6. In particular, if a member which transmits the magnetic flux 9 is used for the spacer 14, it is possible to obtain an effect for restricting the influence of the metal surface 6 and restricting the inductance and the variance of Q due to the difference of the material member for the metal surface 6.

Here, in the drawings, the soft magnetic member 5 and the spacer 14 are disposed so as to be separated clearly. However, for example, it is possible to form a structure in which the contents of the grain powder and the flake which are dispersed in the composite can be adjusted so as to vary the magnetic characteristics of the soft magnetic member 5. By such a structure, it is possible to control the dispersion of the magnetic flux.

Figure 8A:
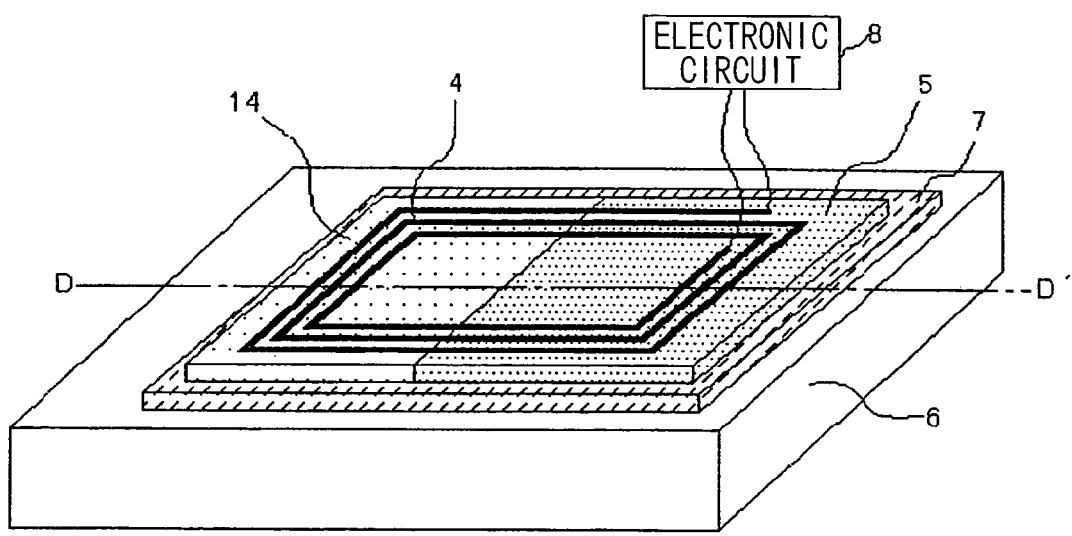
FIGS. 8A and 8B are views for showing a structure for a reader/writer antenna according to a second embodiment of the present invention in which a soft magnetic member, a spacer, and a conductive member are disposed there.
Figure 8B:
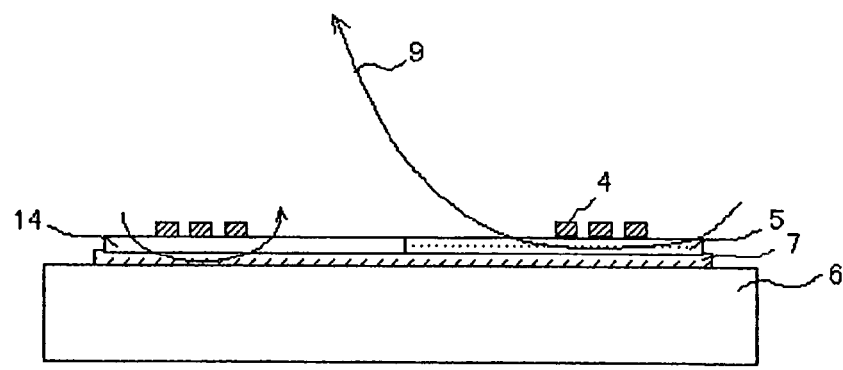

In order to confirm the effect of the above antenna, reader/writer antennae are manufactured which have a structure shown in FIG. 7 in which the soft magnetic member 5 and the spacer 14 are disposed therebetween and structures shown in FIGS. 8A and 8B in which the conductive member 7 is disposed therebeneath; thus, measurement operations are performed for the inductance and Q only for the coil and the inductance and Q for cases in which they are disposed on an aluminum plate, an iron plate, and a stainless steel plate respectively. The results are shown in the above explained TABLES 6 and 7 (in spaces in the second embodiment).

According to the TABLES 6 and 7, it is understood that it is possible to realize a larger inductance than that in the comparison example by disposing the soft magnetic member 5 or the conductive member 7 therebetween as similar to a case of the first embodiment. Also, it is understood that it is possible to maintain a desirable antenna performance even if any material member is used for the metal surface 6 on which the antenna coil 4 is disposed because the variance for the inductance and Q are slight when they are disposed on each metal plate. Here, the values for the inductance and Q are not so different from the values in the first embodiment even though the size for the soft magnetic member 5 and the size of the spacer 14 are set to be approximately equal to each other; thus, it is understood that it is possible to realize a sufficient effect only by disposing the soft magnetic member 5 on only a part of the antenna surface.

THIRD EMBODIMENT

Next, the reader/writer antenna according to the third embodiment of the present invention is explained with reference to FIGS. 9A to 11B. FIGS. 9A to 10B are views for showing a structure for the reader/writer antenna according to the third embodiment of the present invention. FIGS. 11A and 11B are views for showing a position for disposing the reader/writer antenna. Here, the present embodiment is characterized in that the antenna coil is wound around the soft magnetic member. The rest of the features such as a structure, material members, and manufacturing method are the same as those explained in the first and the second embodiments.

Figure 9A:
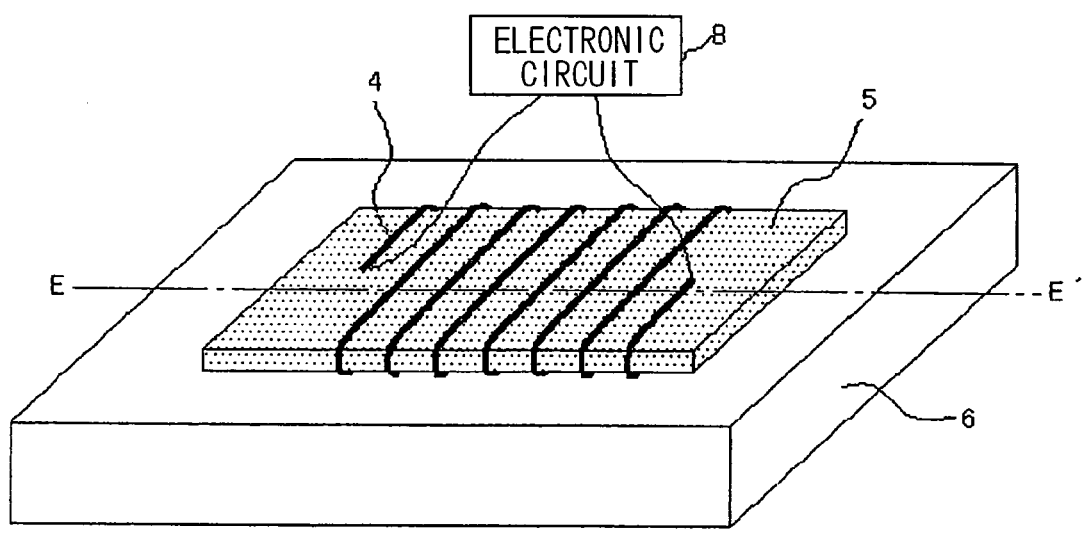
FIGS. 9A and 9B are views for showing a structure for a reader/writer antenna according to a third embodiment of the present invention in which an antenna coil is wound around the soft magnetic member.
Figure 9B:
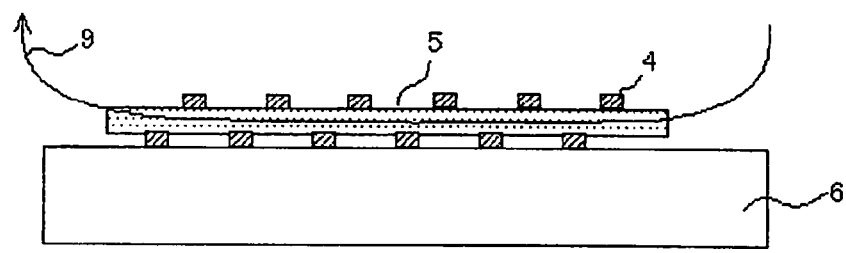

As shown in FIG. 9, a flat soft magnetic member 5 is disposed approximately in parallel with the metal surface 6 in the reader/writer antenna according to the present embodiment and the antenna coil 4 is wound around the soft magnetic member 5 as a magnetic core. In such a structure, a protruding amount of the antenna coil is large because the antenna coil 4 is wound in a three-dimensional manner. However, it is possible to reduce the influence of the metal surface 6 by disposing the magnetic flux 9 in the antenna coil 4 so as to be approximately in parallel with the metal surface 6. Also, it is possible to enhance the performance of the antenna coil 4 easily by increasing the winding amount of the coil 5.

Figure 10A:
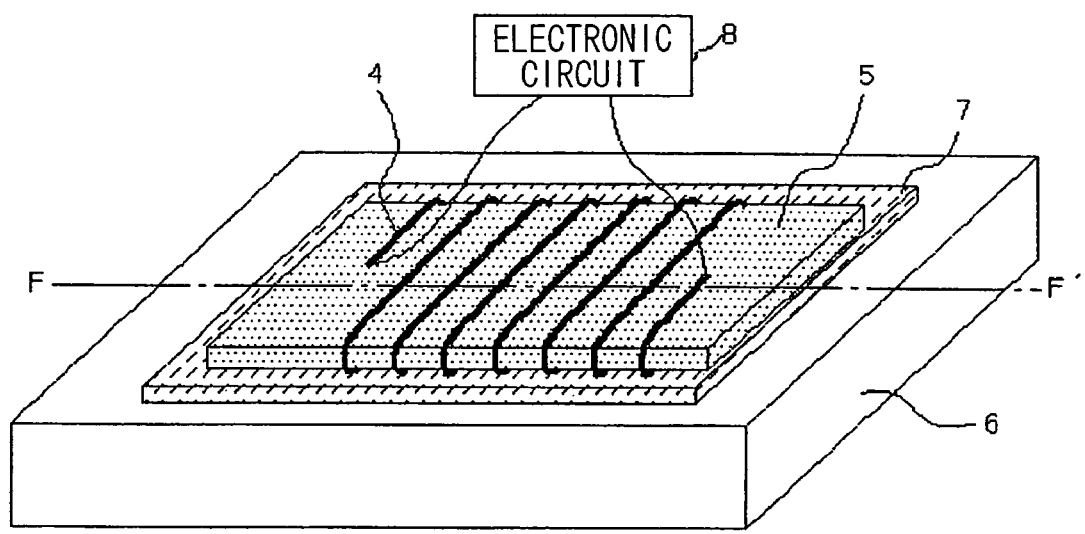
FIGS. 10A and 10B are views for showing a structure for a reader/writer antenna according to a third embodiment of the present invention in which an antenna coil is wound around the soft magnetic member, and a conductive member is disposed therebeneath.
Figure 10B:
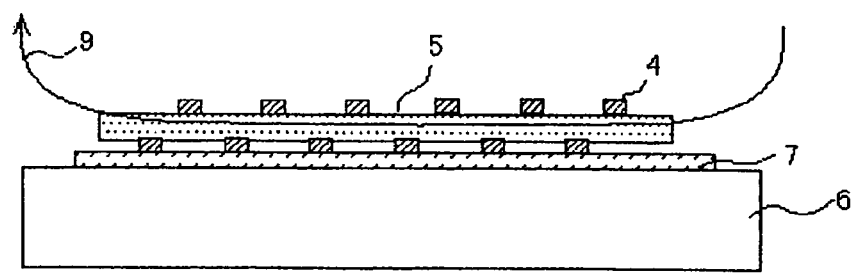
Figure 11A:
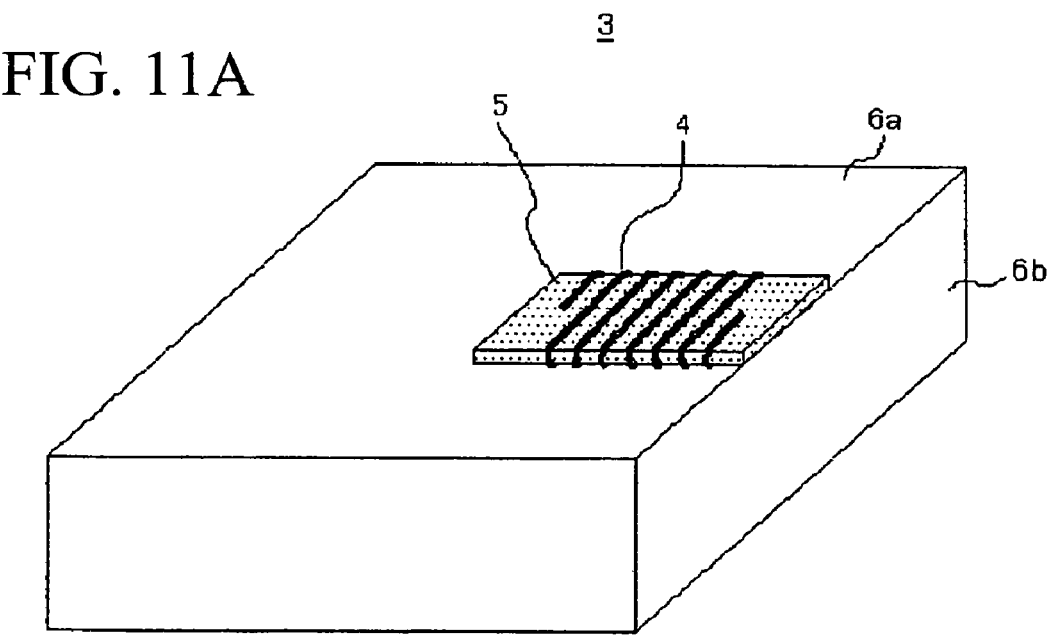
FIGS. 11A to 11B are views for showing a position for installing a reader/writer antenna according to the third embodiment of the present invention.
Figure 11B:
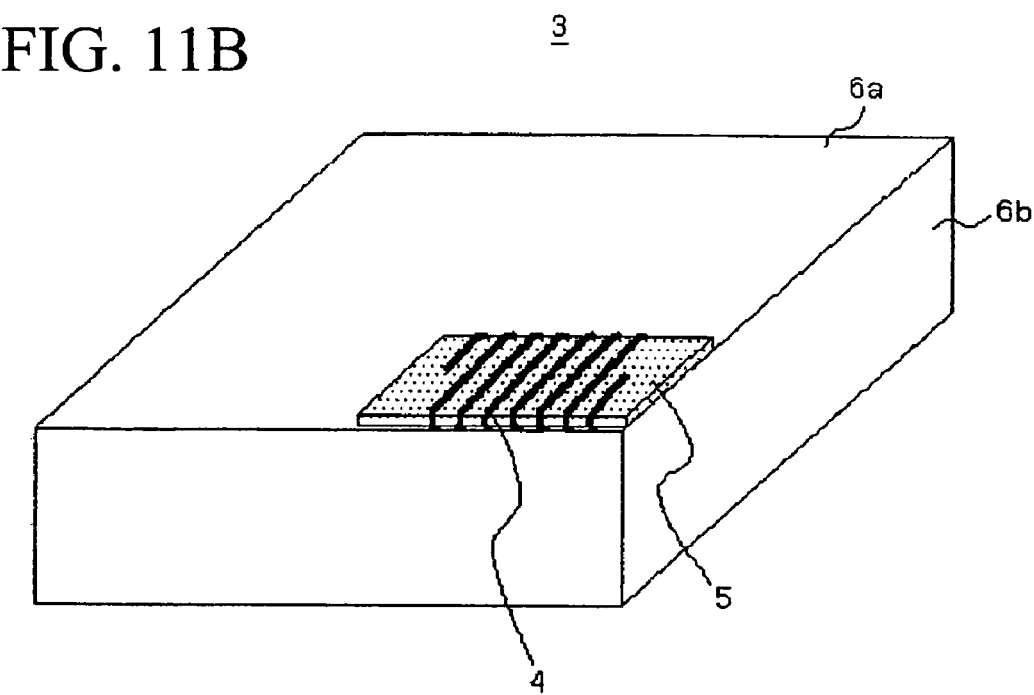

Also, as shown in FIGS. 10A and 10B, it is acceptable if the conductive member 7 which is shown in the first embodiment and the second embodiment is disposed between the antenna coil 4 and the metal surface 6; thus, it is possible to restrict the influence of the metal surface by the conductive member 7; thus, it is possible to realize a larger Q.

In order to confirm the effect of the above antenna, reader/writer antennae are manufactured which have a structure shown in FIG. 9 in which the antenna coil 4 is wound around the soft magnetic member 5 and a structures shown in FIGS. 10A and 10B in which the conductive member 7 is disposed therebeneath; thus, measurement operations are performed for the inductance and Q only for the coil and the inductance and Q for cases in which they are disposed on an aluminum plate, an iron plate, and a stainless steel plate respectively as similarly to cases for the first embodiment and the second embodiment. The results are shown in the above explained TABLES 6 and 7 (in spaces in the third embodiment).

According to the TABLES 6 and 7, as similarly to the first embodiment and the second embodiment, it is possible to realize a larger inductance and the larger Q than those in the comparison example by disposing the soft magnetic member 5 or the conductive member 7 therebetween. In particular, the structure in which the conductive member 7 is disposed hardly receives the influence of the metal surface 6; thus, it is possible to realize a larger Q than those in the first embodiment and the second embodiment.

Here, in cases for structures of the reader/writer antenna according to the present embodiment, the magnetic flux 9 of the antenna coil 4 is disposed toward a parallel direction for the metal surface 6 as shown in FIGS. 9A to 10B; therefore, there are some cases in which better results may be realized if the transponder 2 is approached not from a normal direction of the metal surface 6 but from a direction of the magnetic flux 9. In such a case, as shown in FIGS. 11A and 11B, a surface through which the magnetic flux passes on the soft magnetic member 5 should be disposed near a side surface 6b of the metal surface such that the transponder 2 should be approached from the side surface 6b.

FOURTH EMBODIMENT

Next, the reader/writer antenna according to the fourth embodiment of the present invention is explained with reference to FIGS. 12A to 14B. FIGS. 12A to 14B are views for showing a structure of the reader/writer antenna according to the fourth embodiment. Here, the present embodiment is characterized in that the antenna coil is wound around the columnar soft magnetic member such that the antenna surface should be in parallel with the metal surface approximately. The rest of the features such as a structure, material members, and manufacturing method are the same as those explained in the first to the third embodiments.

Figure 12A:
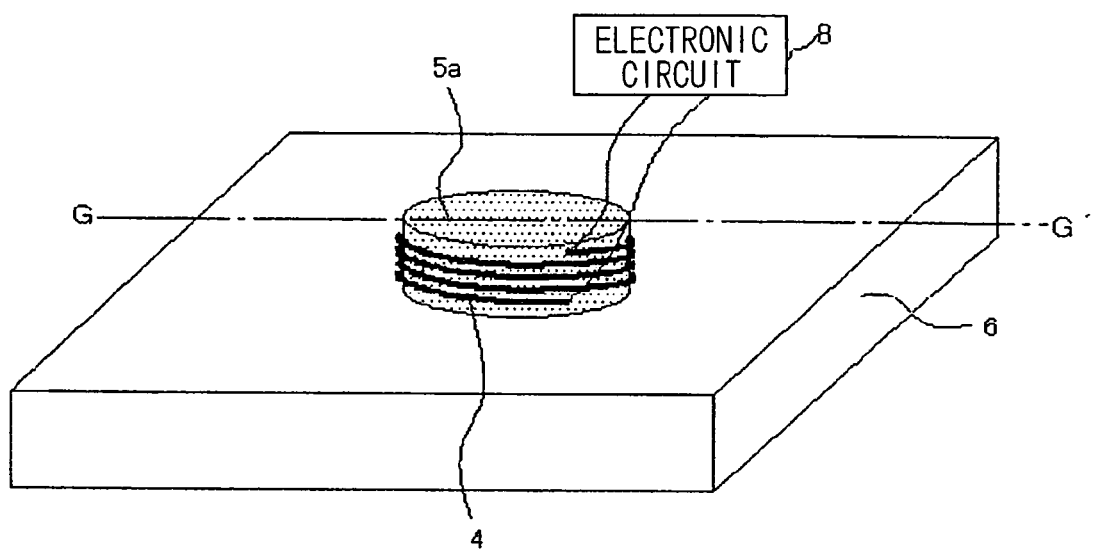
FIGS. 12A and 12B are views for showing a structure for a reader/writer antenna according to a fourth embodiment of the present invention in which an antenna coil is wound around a columnar soft magnetic member.
Figure 12B:
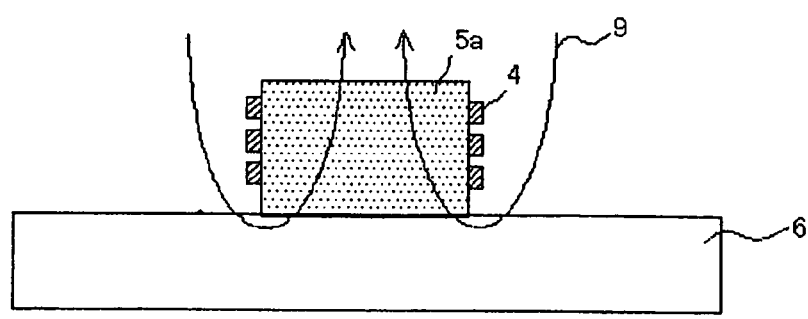

As shown in FIGS. 12A and 12b, in the reader/writer antenna according to the present embodiment, the antenna coil 4 is wound around the columnar soft magnetic member 5a as a magnetic core of which bottom surface is in parallel with the metal surface 6 approximately. Although, in such a structure, the protruding amount of the antenna coil 4 is large so as to wind the antenna coil 4 in a three-dimensional manner, it is possible to enhance the performance of the antenna coil 4 by increasing the winding amount as similarly to the structure of the third embodiment. Also, there is a characteristic in that it is is possible to increase the area for the antenna more than the area of the third embodiment.

Figure 13A:
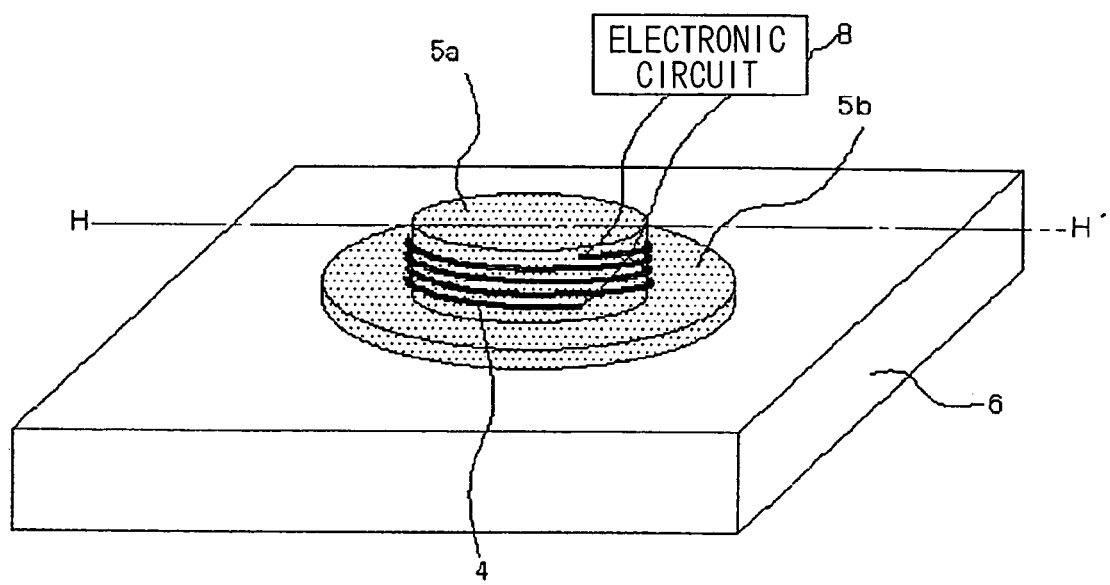
FIGS. 13A and 13B are views for showing a structure for a reader/writer antenna according to a fourth embodiment of the present invention in which a flat plate soft magnetic member is disposed beneath the columnar soft magnetic member.
Figure 13B:
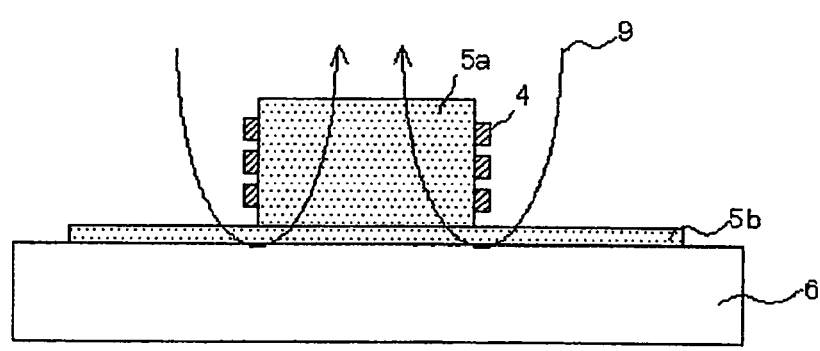
Figure 14A:
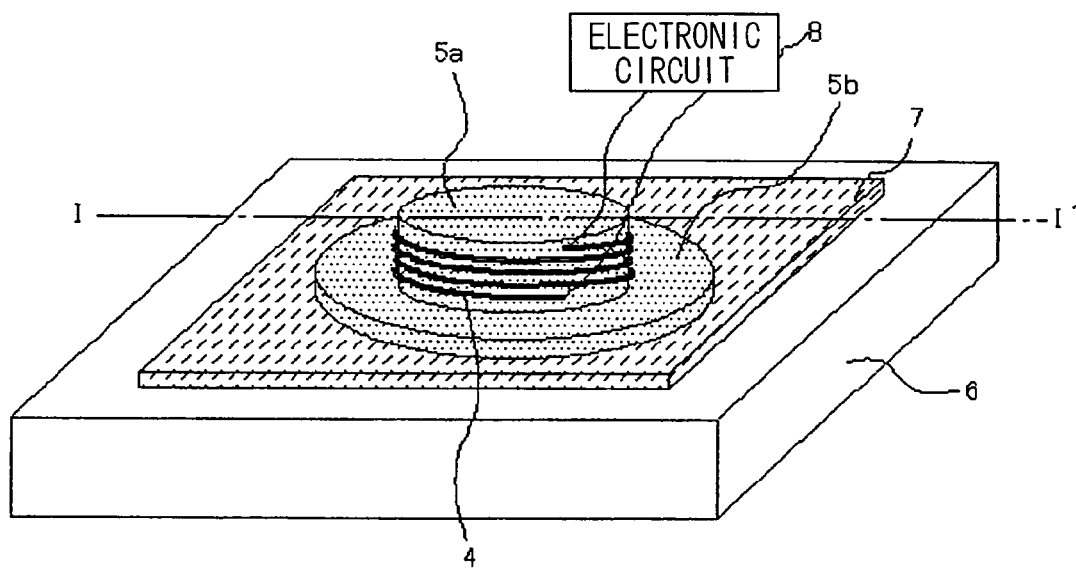
FIGS. 14A and 14B are views for showing a structure for a reader/writer antenna according to a fourth embodiment of the present invention in which a flat plate soft magnetic member and the conductive member are disposed beneath the columnar soft magnetic member.
Figure 14B:
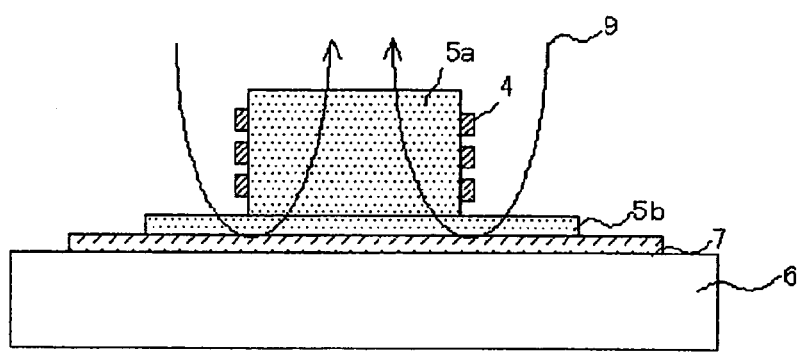

Also, as shown in FIGS. 13A and 13B, it is acceptable if the flat plate soft magnetic member 5b is further disposed between the soft magnetic member 5a around which the antenna coil 4 is wound and the metal surface 6. Also, as shown in FIGS. 14A and 14B, it is acceptable if the conductive member 7 is disposed between the soft magnetic member 5b and the metal surface 6. By doing this, it is possible to restrict the influence of the metal surface 6 by the soft magnetic member 5b and the conductive member 7.

Here, in the each of the above embodiment, explanations are made for the the reader/writer antenna. However, the present invention is not limited to the above embodiments. That is, the present invention can be applied for a transponder antenna which is disposed so as to contact a conductive object such as a metal casing, etc.

INDUSTRIAL APPLICABILITY

As explained above, the reader/writer antenna of the present invention realizes following effects.

A first effect of the present invention is that it is possible to restrict the influence of the metal surface even if the antenna coil is disposed on the metal surface and realize a large inductance and Q.

The reason is that the soft magnetic member is disposed between the antenna coil and the metal surface so as to pass the magnetic flux which is generated by the antenna coil through the soft magnetic member; thus, it is possible to restrict the influence of the eddy current which is generated in the metal member. Also, it is because that it is possible to cut the magnetic flux reliably by disposing the conductive member which has a predetermined resistivity between the soft magnetic member and the metal surface.

Also, a second effect of the present invention is that the electronic circuit in an apparatus in which the antenna coil is disposed can not hardly be received.

The reason is that, if a radiowave which leaks from the electronic circuit of the reader writer enters into the antenna, the disturbance such as a howling occurs, however, it is possible to block the leaking radiowave from the electronic circuit by inserting a conductive member between the antenna and the casing or by forming the casing by a metal member.

Also, a third effect of the present invention is that it is possible to dispose an antenna coil directly on the flat metal surface of a casing for the reader/writer; thus, it is possible to enhance a flexibility for the design of the device.

The reason is that it is possible to form a thin soft magnetic member by using a composite which has an organic member in which a grain powder or a flake are disposed. In particular, in a structure in which the flake is disposed by applying a magnetic field during manufacturing the composite, it is possible to realize a desirable performance even in the soft magnetic member is formed in a thickness such as several milimeters or smaller; thus, it is possible to restrict the protrusion of the antenna part.

The invention claimed is:

1. A reader/writer antenna which is used with a Radio Frequency Identification (RFID) system for non-contacting data communication comprising:
   a soft magnetic member configured to be disposed on a surface;
   an antenna coil which is formed by at least one turn and disposed on the soft magnetic member; and
   a conductive member disposed on said soft magnetic member on an opposite side of a placement of the antenna coil,
   wherein an object with said reader/writer antenna affixed thereon is a metal member or a member which contains the metal member.

2. A reader/writer antenna according to claim 1 wherein the antenna coil is wound in a spiral manner.

3. A reader/writer antenna according to claim 1 wherein the soft magnetic member is formed to contact a part of an antenna coil surface defined planarly by the one turn of the antenna coil so that a magnetic flux which is generated by the antenna coil is formed asymmetrically with reference to a center axis of the antenna coil.

4. A reader/writer antenna according to claim 1 wherein the soft magnetic member is a compound of either a metal powder, a flake or a ferrite powder, which are formed by flattening a metal powder.

5. A reader/writer antenna according to any of claims 1-3, wherein the soft magnetic member is one of an amorphous alloy, a permalloy, a magnetic steel, a silicon steel, a sendust alloy, a Fe—AL alloy, or a soft magnetic ferrite.

6. A reader/writer antenna according to claim 1 wherein the soft magnetic member is an amorphous film or a layered member of an amorphous film.

7. A reader/writer antenna which is used with a Radio Frequency Identification (RFID) system for non-contacting data communication comprising:
   a soft magnetic member configured to be disposed on a surface; and
   an antenna coil which is formed by at least one turn and is disposed on the soft magnetic member,
   wherein a thickness t for the soft magnetic member or a magnetic core for forming a plate satisfies a relationship $S/L > t > S/(L/\mu)$ under condition that S indicates an area for the antenna coil, L indicates a circumferential length of the antenna coil, and $\mu$ indicates a magnetic transmittance ratio of the soft magnetic member or the magnetic core.

8. A reader/writer antenna which is used with a Radio Frequency Identification (RFID) system for non-contacting data communication comprising:
   a soft magnetic member configured to be disposed on a surface; and
   an antenna coil which is formed by at least one turn and disposed on the soft magnetic member,
   wherein the soft magnetic member is a compound of either a metal powder, a flake or a ferrite powder, which are formed by flattening a metal powder,
   wherein the metal powder is one of a carbonyl iron powder, a reduced iron powder, an atomized powder, or an amorphous powder, and
   the reader/writer antenna is configured to be disposed so as to contact a casing which is formed by a non-magnetic member which has an initial resistance of approximately $10 \times 10^{-8}$ $\Omega$m or lower.

9. A reader/writer antenna which is used with a Radio Frequency Identification (RFID) system for non-contacting data communication comprising:
   a soft magnetic member configured to be disposed on a surface; and
   an antenna coil which is formed by at least one turn and disposed on the soft magnetic member,
   wherein the soft magnetic member is a compound of either a metal powder, a flake or a ferrite powder, which are formed by flattening a metal powder,
   wherein the metal powder or the flake is made by flattening a water-atomized iron base alloy or an iron base alloy powder mechanically, and
   the reader/writer antenna is configured to be disposed so as to contact a casing which is formed by a non-magnetic member which has an initial resistance of approximately $10 \times 10^{-8}$ $\Omega$m or lower.

10. A reader/writer antenna according to claim 9 wherein the iron base alloy contains 6 w % to 15 w % of silicon.

11. A reader/writer antenna which is used with a Radio Frequency Identification (RFID) system for non-contacting data communication comprising:
   a soft magentic member configured to be disposed on a surface; and
   an antenna coil which is formed by at least one turn and disposed on the soft magnetic member,
   wherein the soft magnetic member is a compound of either a metal powder, a flake or a ferrite powder, which are formed by flattening a metal powder,
   wherein the metal powder or the flake is made by flattening a water-atomized iron base alloy or an iron base alloy powder mechanically, and
   the iron base alloy contains at least approximately 1 w % of aluminum or lower, approximately 3 w % of nickel or copper or lower, approximately 5 w % of chromium or lower, approximately 10 w % of cobalt or lower in addition to approximately 6 w % to 15 w % of silicon.

12. A reader/writer antenna which is used with a Radio Frequency Identification (RFID) system for non-contacting data communication comprising:
   a soft magnetic member configured to be disposed on a surface; and
   an antenna coil which is formed by at least one turn and disposed on the soft magnetic member,
   wherein the soft magnetic member is a compound of either a metal powder, a flake or a ferrite powder, which are formed by flattening a metal powder, and
   wherein the compound is an injection molded member, a compressed molded member, a rolled stripped member, or a member to which a painting member is applied.

13. A reader/writer antenna which is used with a Radio Frequency Identification (RFID) system for non-contacting data communication comprising:
   a soft magnetic member configured to be disposed on a surface of an object; and
   an antenna coil which is formed by at least one turn and is disposed on the soft magnetic member,
   wherein a non-magnetic conductive member of which resistivity is approximately $10 \times 10^{-8}$ $\Omega$m or lower or a conductive member of which resistivity is approximately $3 \times 10^{-8}$ $\Omega$m is configured to be disposed between the soft magnetic member and the object.

14. A reader/writer antenna which is used with a Radio Frequency Identification (RFID) system for non-contacting data communication comprising:
   a soft magnetic member configured to be disposed on a surface of an object; and
   an antenna coil which is formed by at least one turn and is disposed on the soft magnetic member,
   wherein a non-magnetic conductive member has a 0.015 $\Omega$ resistance or lower with 1 cm length, 1 cm width, and is configured to be disposed between the soft maghetic member and the objuect.

15. A reader/writer antenna which is used with a Radio Frequency Identification (RFID) system for non-contacting data communication comprising:
   a soft magnetic member configured to be disposed on a surface;
   an antenna coil which is formed by at least one turn and disposed on the soft magnetic member; and
   conductive member disposed on said soft magnetic member on an opposite side of a placement of the antenna coil,
   wherein the reader/writer antenna is configured to be disposed so as to contact a casing which is formed by a non-magnetic member which has an initial resistance of approximately $10 \times 10^{-8}$ $\Omega$m or lower.

16. A reader/writer antenna which is used with a Radio Frequency Identification (RFID) system for non-contacting data communication comprising:
   a soft magnetic member configured to be disposed on a surface; and
   an antenna coil which is formed by at least one turn and disposed on the soft magnetic member,
   wherein the antenna coil is wound in a spiral manner, and said antenna is configured to be disposed so as to contact a casing made of a conductive member which has 0.015 $\Omega$ or lower resistance.

* * * * *